US012450780B2

(12) United States Patent
Janus et al.

(10) Patent No.: US 12,450,780 B2
(45) Date of Patent: Oct. 21, 2025

(54) MULTI-PLANE IMAGE COMPRESSION

(71) Applicant: Intel Corporation, Santa Clara, CA (US)

(72) Inventors: Scott Janus, Loomis, CA (US); Jill Boyce, Portland, OR (US); Atul Divekar, Folsom, CA (US); Jason Tanner, Folsom, CA (US); Sumit Bhatia, Folsom, CA (US); Penne Y. Lee, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 17/926,532

(22) PCT Filed: Jun. 18, 2021

(86) PCT No.: PCT/US2021/038095
§ 371 (c)(1),
(2) Date: Nov. 18, 2022

(87) PCT Pub. No.: WO2021/257992
PCT Pub. Date: Dec. 23, 2021

(65) Prior Publication Data
US 2023/0360272 A1    Nov. 9, 2023

Related U.S. Application Data

(60) Provisional application No. 63/041,589, filed on Jun. 19, 2020.

(51) Int. Cl.
*G06T 9/00* (2006.01)
(52) U.S. Cl.
CPC ..................................... *G06T 9/00* (2013.01)

(58) Field of Classification Search
CPC ......... G06T 9/00; G06T 15/205; G06T 15/08; G06T 15/04; G06T 2207/10024;
(Continued)

(56) References Cited

U.S. PATENT DOCUMENTS

| 2010/0079489 A1* | 4/2010 | Cheng | ................. G09G 5/14 345/522 |
| 2016/0227251 A1* | 8/2016 | Lee | ................. H04N 19/593 |

(Continued)

FOREIGN PATENT DOCUMENTS

| JP | 2003022453 A | 1/2003 |
| JP | 2013084155 A | 5/2013 |

(Continued)

OTHER PUBLICATIONS

European Patent Office, "Extended European Search Report," issued in connection with European Patent Application No. 21825032.2-1207, dated May 16, 2024, 6 pages.

(Continued)

*Primary Examiner* — Henok Shiferaw
*Assistant Examiner* — Woo C Rhim
(74) *Attorney, Agent, or Firm* — Hanley, Flight & Zimmerman, LLC

(57) ABSTRACT

Example methods, apparatus, systems and articles of manufacture (e.g., physical storage media) to implement multi-plane image (MPI) compression are disclosed. Example apparatus disclosed herein include an interface to access an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images. Disclosed example apparatus also include a compressed image encoder (Continued)

to at least one of (i) convert the plurality of texture images to a single composite texture image to generate a compressed multiplane image stack, or (ii) convert the plurality of alpha images to a single composite alpha image to generate the compressed multiplane image stack. In some disclosed examples, the interface is to output the compressed multiplane image stack.

20 Claims, 20 Drawing Sheets

(58) Field of Classification Search
CPC ........ G06T 7/50; H04N 19/597; H04N 19/90; H04N 19/21; H04N 19/70; H04N 13/111; H04N 13/271; H04N 13/395; H04N 13/117; H04N 13/15; H04N 13/161; H04N 13/282; H04N 19/25; G09G 2340/10
See application file for complete search history.

(56) References Cited

U.S. PATENT DOCUMENTS

| | | | |
|---|---|---|---|
| 2020/0137380 A1* | 4/2020 | Supikov | G06N 3/063 |
| 2020/0228774 A1* | 7/2020 | Kar | H04N 23/635 |
| 2021/0211593 A1 | 7/2021 | Overbeck | |
| 2021/0250571 A1* | 8/2021 | Xu | H04N 13/395 |
| 2023/0186522 A1* | 6/2023 | Dore | H04N 19/21 |
| | | | 345/419 |
| 2023/0206511 A1* | 6/2023 | Overbeck | G06T 7/50 |
| | | | 345/419 |
| 2023/0308621 A1* | 9/2023 | Chupeau | G06T 3/40 |
| 2023/0360272 A1* | 11/2023 | Janus | G06T 9/00 |
| 2024/0073551 A1* | 2/2024 | Overbeck | H04N 25/41 |

FOREIGN PATENT DOCUMENTS

| | | |
|---|---|---|
| JP | 2021111335 A | 8/2021 |
| KR | 20200041340 | 4/2020 |
| WO | 2021257992 A1 | 12/2021 |

OTHER PUBLICATIONS

Patent Cooperation Treaty, "International Search Report", issued in connection with International Application No. PCT/US2021/038095, dated Oct. 1, 2021, 4 pages.

Patent Cooperation Treaty, "Written Opinion", issued in connection with International Application No. PCT/US2021/038095, dated Oct. 1, 2021, 5 pages.

Zhou et al., "Stereo Magnification: Learning view synthesis using multiplane images," ACM Trans. Graph., vol. 37, No. 4, Article 65, Retrieved from [arXiv:1805.09817v1 [cs.CV]], dated May 24, 2018, 12 pages.

Wiles et al., "SynSin: End-to-end View Synthesis from a Single Image," Retrieved from [arXiv:1912.08804v2 [cs.CV]], dated Apr. 18, 2020, 22 pages.

Choi et al., "Extreme View Synthesis," Retrieved from [arXiv:1812.04777v2 [cs.CV]], dated Aug. 30, 2019, 10 pages.

The International Bureau of WIPO, "International Preliminary Report on Patentability," in connection with International Patent Application No. PCT/US2021/038095, mailed on Dec. 29, 2022, 7 pages.

Mildenhall et al., "Local Light Field Fusion:Practical View Synthesis with Prescriptive Sampling Guidelines," ACM Trans. Graph., vol. 38, No. 4, Article 29, Jul. 2019, 14 pages.

Boyce et al., "MPEG Immersive Video Coding Standard," Proceedings of the IEEE, 2021, 16 pages.

Interdigital, "Volumetric Video: The "MPEG Metadata for Immersive Video" Distribution Format," 2019, 27 pages.

Senoh et al., Consideration of image depth information [online], JVT-X Jun. 27, 053, 2007.

Janus, et al., "Multi-Plane Image Video Compression," Proceedings of 2020 IEEE 22nd International Workshop on Multimedia Signal Processing (MMSP), IEEE, 2020.09.24, pp. 1-6. (Pre-publication version).

Japanese Patent Office, "Search Report" issued in connection with Japanese Patent Application No. 2022-560442, dated Jun. 2, 2025, 59 pages. (English translation included).

Japanese Patent Office, "Decision to Grant a Patent," issued in connection with Japanese Patent Application No. 2022-560442, dated Jun. 17, 2025, 6 pages. (English translation included).

* cited by examiner

MULTI-PLANE IMAGE COMPRESSION

RELATED APPLICATION(S)

This patent arises from the national stage of International Patent Application No. PCT/US2021/038095, which is titled "MULTI-PLANE IMAGE COMPRESSION," and which was filed on Jun. 18, 2021, which claims the benefit of U.S. Provisional Application No. 63/041,589, which is titled "COMPRESSION OF MULTIPLANE IMAGES FOR PARALLAX-ENABLED VIDEO RENDERING," and which was filed on Jun. 19, 2020. Priority to International Patent Application No. PCT/US2021/038095 and U.S. Provisional Application No. 63/041,589 is claimed. International Patent Application No. PCT/US2021/038095 and U.S. Provisional Application No. 63/041,589 are hereby incorporated by reference in their respective entireties.

FIELD OF THE DISCLOSURE

This disclosure relates generally to image compression and, more particularly, to multi-plane image compression.

BACKGROUND

Three-dimensional (3D) image rendering techniques sometimes use multi-plane images (MPI) that form a stack of semi-transparent image planes to represent different depths of a 3D scene. Each plane of the MPI stack includes a texture image and an alpha image. The texture image provides the texture pixel values (e.g., red-blue-green, or RBG values), and the alpha image includes alpha pixel values that indicate the transparency of the respective texture pixels. If the alpha value is large, the texture pixel is opaque and the background cannot be seen. If the alpha value is small, the texture pixel is transparent, and the background can be seen. In some examples, the MPI stack is generated on one platform (e.g., where a source camera is deployed) and then transmitted to another platform (e.g., a target/client platform) upon which the 3D images are rendered corresponding to desired viewpoints.

Figure 1:
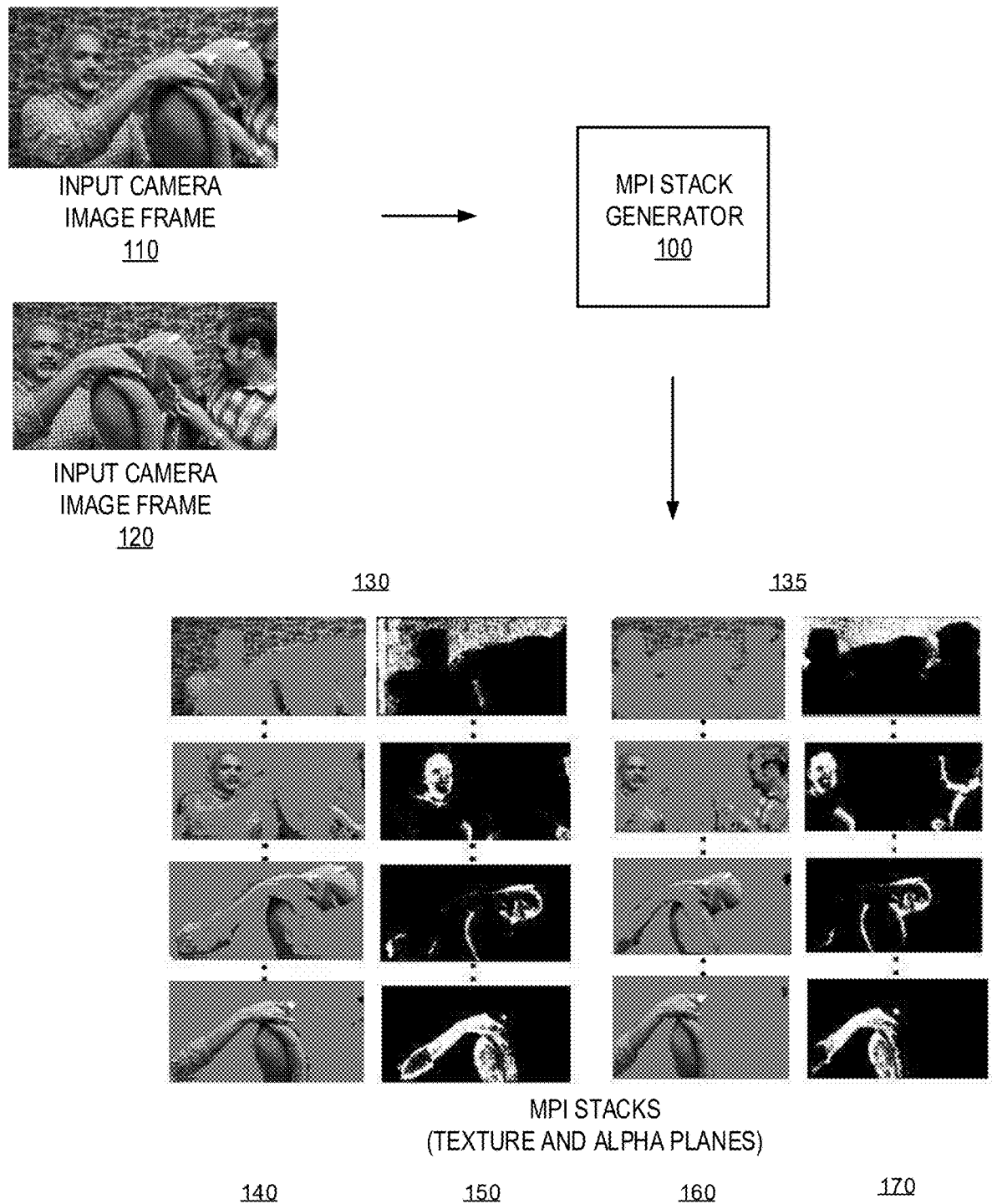
FIG. 1 is a block diagram of an example MPI stack generator to generate MPI stacks from source images.

The figures are not to scale. In general, the same reference numbers will be used throughout the drawing(s) and accompanying written description to refer to the same or like parts, elements, etc. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Example methods, apparatus, systems and articles of manufacture (e.g., physical storage media) to implement multi-plane image (MPI) compression are disclosed. In general, MPI systems use machine learning to create a volumetric representation of a scene as a stack of semi-transparent images or planes that contain textures derived from the original camera view. When these planes are stacked on top of each other, the original camera view is recovered. These stacks can be used to render the scene that would be visible from novel viewpoints with a visual quality that surpasses many other viewpoint interpolation techniques.

As noted above, the MPI stack includes a stack of texture images (also referred to herein as texture image planes or texture planes) and a stack of alpha images (also referred to herein as alpha image planes or alpha planes). The texture images and alpha images collectively represent different depths of a source camera view. The texture image for a given depth provides the texture pixel values (e.g., red-blue-green, or RBG values), and the alpha image includes alpha pixel values that indicate the transparency of the respective texture pixels, with increasing alpha values representing increasing opacity (or decreasing transparency) and decreasing alpha values representing decreasing opacity (or increasing transparency). In some examples, the MPI stack is generated on a source platform (e.g., where the camera is deployed) and then transmitted to a target platform (e.g., a client platform) upon which the 3D images are rendered corresponding to desired viewpoints.

Example MPI compression techniques disclosed herein reduce the quantity of MPI data to be transferred to a target platform for image rendering, while maintaining the quality of the rendered image. As such, example MPI compression techniques disclosed herein allow for a lower-bandwidth transmission to the target or rendering node relative to the transmission bandwidth required for other (e.g., conventional) techniques. Thus, example MPI compression techniques disclosed can enable execution of virtual reality and immersive media applications one resource-constrained platforms, but can also be used in any number of image processing systems and applications.

In some examples, rather than transmitting a stack of N texture and alpha planes (e.g., where N=32 or some other value), the disclosed example MPI compression techniques generate a single composite texture frame and/or a single composite alpha frame (also referred to as an alpha map frame) that are derived from the MPI stack, and that collectively contain sufficient information for an MPI image rendering system to provide a quality rendering of the stack information. In some examples, the single composite alpha frame and single composite texture are generated from the MPI stack by a disclosed example encoder on the source (e.g., transmitting) platform. At the target (e.g., receiving) platform, a disclosed example decoder uses the single composite alpha frame and single composite texture frame to reconstruct the stack of N planes of the MPI stack to be used by the MPI renderer to render the target image.

It will be appreciated that disclosed example MPI compression techniques are able to reduce the bitrate and pixel rate (e.g., by a factor of N, such as N=32 or some other value) used to transmit MPI data, as compared to systems that transmit all of the N texture and alpha planes. This, in turn, reduces the bandwidth and computational burden at the target (e.g., client) image renderer. Thus, disclosed example techniques enable a video system to provide an immersive media experience on resource-constrained platforms including, for example, tablets, laptops, smartphones, and other such devices that may be constrained with respect to transmission bandwidth and/or computational bandwidth.

Turning to the figures, a block diagram of an example MPI stack generator 100 to generate MPI stacks from source images is illustrated in FIG. 1. In the MPI stack generator 100 implements one or more machine learning models to generate an MPI stack from multiple example source camera images frames 110 and 120. Any appropriate machine learning model may be implemented by the MPI stack generator 100. In some examples, a local light field fusion (LLFF) model may be used as the machine learning model implemented by the MPI stack generator 100. In some examples, the LLF model use images from several adjacent cameras as samples of a lightfield. These samples are used to generate stacks of MPI planes, which can be used to expand the acceptable viewing range where a target (e.g., virtual) camera can be positioned. This approach also allows for the capture and reproduction of viewpoint dependent lighting effects such as specular highlights, refractions, and reflections. In the illustrated example of FIG. 1, the MPI stack generator 100 implements a trained deep learning LLF model that generates example MPI stacks 130 and 135 from the source camera images frames 110 and 120, and which correspond to the respective, adjacent camera viewpoints associated with the source cameras that provided the source camera images frames 110 and 120.

In the illustrated example of FIG. 1, a generated MPI stack, such as the MPI stacks 130 and 135, represents a number of planes N (such as N=32 or some other value) that are placed in the view frustrum of corresponding source camera such that the inverses of the depths of the planes are uniformly spaced in the range $[1/d_{max} \ldots 1/d_{min}]$, where $d_{min}$ and $d_{max}$ are the minimum and maximum depths of the view frustum relative to the camera center. As illustrated in the example of FIG. 1, the generated MPI stack 130 includes an example texture image stack 140 associated with a view frustrum (or field of view) of a first camera corresponding to the source image frame 110, and an example alpha stack 150 associated with the view frustrum (or field of view) of the first camera corresponding to the source image frame 110. Likewise, the generated MPI stack 135 includes an example texture image stack 160 associated with a view frustrum (or field of view) of a second camera corresponding to the source image frame 120, and an example alpha stack 170 associated with the view frustrum (or field of view) of the second camera corresponding to the source image frame 115. In the following disclosure, the processing of N=32 planes will be described, but in practice any number of planes may be used.

To render a scene for a desired viewpoint of a target, virtual camera, the MPI stack is warped to the coordinate system of the virtual camera, and the planes are composited from back to front with the alpha values used as a weighting factor applied to the texture value of each texture plane. As such, MPI-based techniques allow view synthesis with less computation than conventional 3D mesh projection, but at a cost of decreasing quality as the virtual camera moves away from the source cameras. Also, a 32-plane MPI stack with 1920×1080 resolution and 8-bit red, green, blue, and alpha (RGBA) samples for each pixel includes 0.265 gigabits (GB) of data. When conventional MPI-based techniques are used to encode and render a video sequence at 30 frames per second (fps), a bandwidth of 63.7 Gb/s would be utilized for a single camera source, and correspondingly higher bandwidths would by utilized for multiple camera inputs. This bandwidth utilization may be large enough such that MPI-based techniques may be impractical for some applications. The high pixel rate may also place a large computational burden at the source (e.g., transmission) platform encoder and the target (e.g., client) platform decoder/renderer, which may make conventional MPI-based techniques unsuitable for some client video applications.

Figure 2:
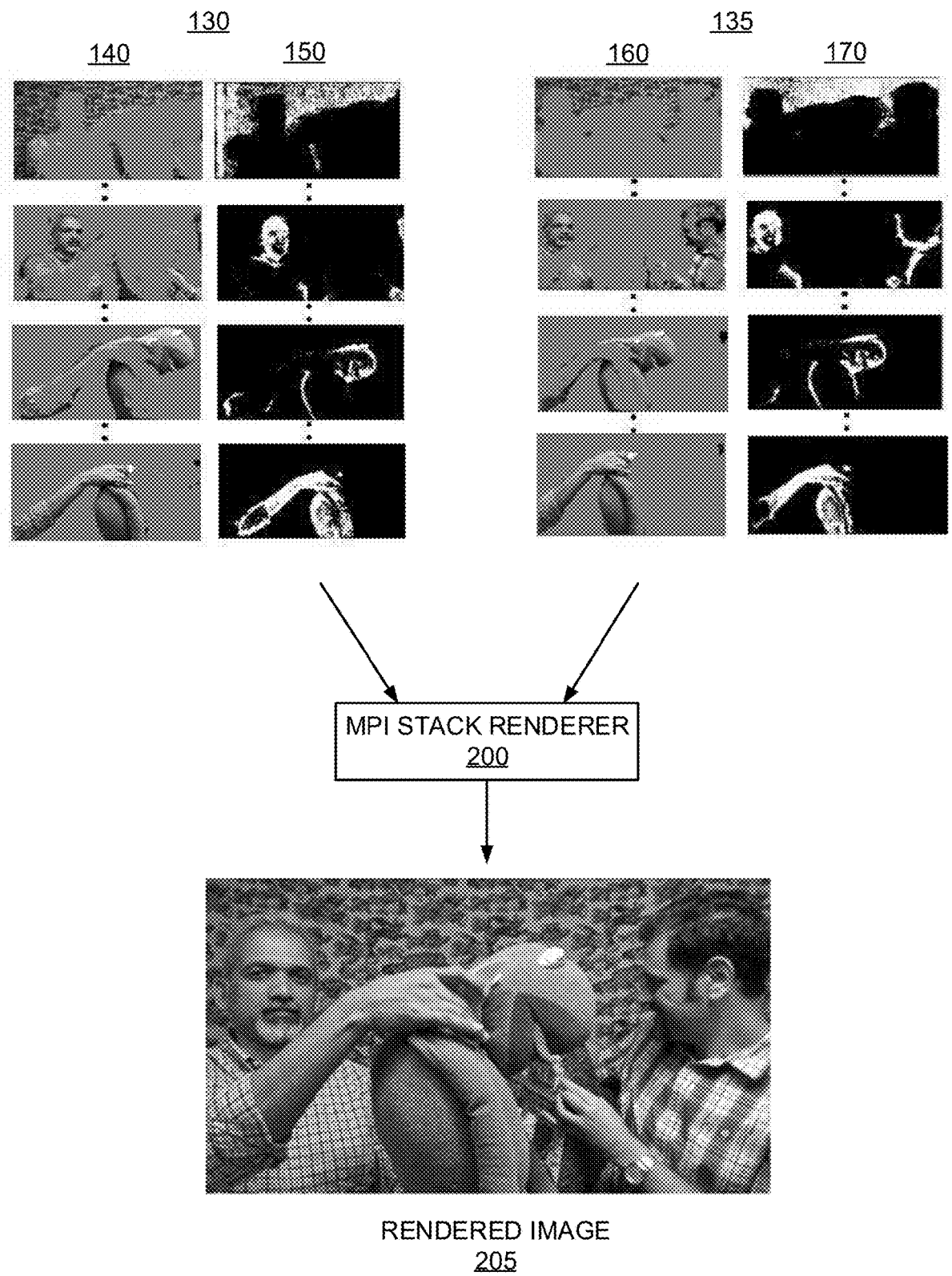
FIG. 2 is a block diagram of an example MPI renderer to render a target image from one or more MPI stacks.

A block diagram of an example MPI renderer 200 to render an example target image 205 from one or more MPI stacks is illustrated in FIG. 2. In the illustrated example of FIG. 2, the MPI renderer 200 is implemented at a target platform and receives the MPI stacks 130 and 135 described above in connection with FIG. 1. As described above, the MPI stack 130 includes the texture image stack 140 and the alpha image stack 150, and the MPI stack 135 includes the texture image stack 160 and the alpha image stack 170. The MPI renderer 200 of the illustrated example weights the texture images 140 and 160 by the respective alpha images 1150 and 170, and then blends the weighed images to create the rendered image 205 corresponding to the target viewpoint. In some examples, the blending performed by the MPI renderer 200 includes warping the texture image stacks 140 and 160, and the alpha image stacks 150 and 170, to the coordinate system of the target camera.

Figure 3:
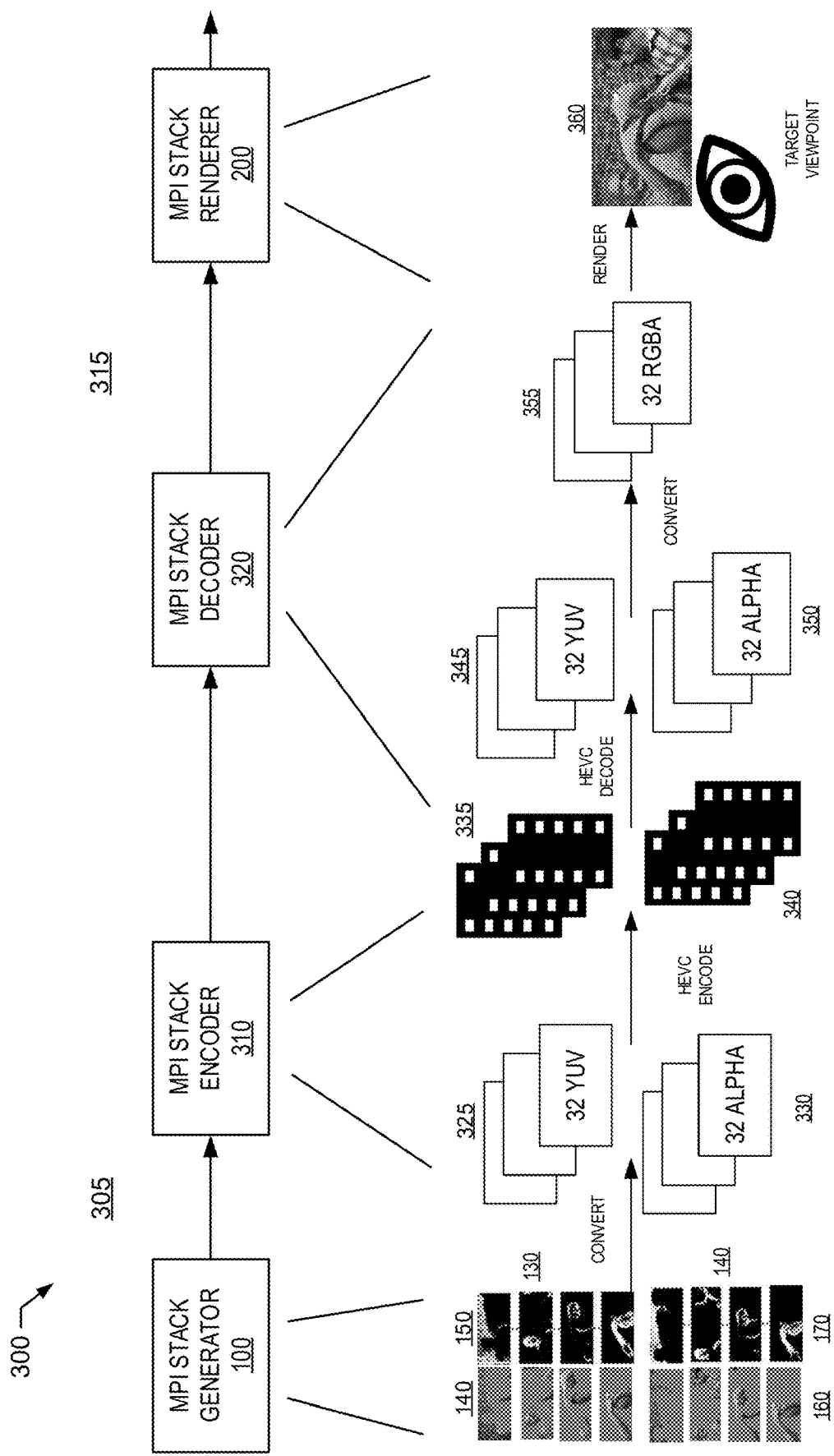
FIG. 3 is a block diagram of an example video encoding and decoding system that includes the MPI stack generator of FIG. 1 and the MPI renderer of FIG. 2.

A block diagram of an example video encoding and decoding system 300 that includes the MPI stack generator 100 of FIG. 1 and the MPI renderer 200 of FIG. 2 is illustrated in FIG. 3. The video encoding and decoding system 300, also referred to as the video system 300, of the illustrated example includes an example source platform 305, which includes the MPI stack generator 100 and an example MPI stack encoder 310, and an example target platform 315, which includes an example MPI stack decoder 320 and the MPI renderer 200. The source platform 305 can be implemented by any computing platform/device, such as, but not limited to, one or more servers, personal computers, workstation, mobile devices (e.g., a cell phone, a smart phone, a tablet such as an iPad™), a personal digital assistant (PDA), an Internet appliance, a camera, etc. Similarly, the target platform 315 can be implemented by any computing platform/device, such as, but not limited to, one or more servers, personal computers, workstation, mobile devices (e.g., a cell phone, a smart phone, a tablet such as an iPad™), a PDA, an Internet appliance, a DVD player, a CD player, a digital video recorder, a Blu-ray player, a gaming console, a personal video recorder, a set top box, etc.

In the illustrated example of FIG. 3, the MPI stack generator 100 of the source platform 305 generates, as described above, respective MPI stacks, such as the MPI stacks 130 and 135, for each input video frame to be encoded and stored/transmitted by the source platform 305. The generated MPI stacks 130 and 135 have respective texture stacks 140 and 160 with pixels represented in RGB format. The MPI stack encoder 310 of the illustrated example converts the MPI stacks 130 and 135 to respective example texture image stacks 325 and respective example alpha image stacks 330, with the pixels of the texture image 325 converted to luminance and chrominance format, such as the YUV format, and the pixels of the alpha images 330 unchanged. The MPI stack encoder 310 encodes the texture images of the texture image stacks 325 and the alpha images of the alpha image stacks 330 using any video encoder, such as an encoder implementing high efficiency video encoding (HEVC), to create example encoded texture video frames 335 and example encoded alpha video frames 340. The MPI stack encoder 310 then stores the encoded texture video frames 335 and the encoded alpha video frames 340 and/or transmits the encoded texture video frames 335 and the encoded alpha video frames 340 to the target platform 315.

In the illustrated example of FIG. 3, the MPI stack decoder 320 of the target platform 315 decodes the received or otherwise accessed encoded texture video frames 335 and encoded alpha video frames 340 using an appropriate video decoder, such as decoder implementing HEVC decoding, associated with the video encoder utilized by the MPI stack encoder 310. The results of such video decoding are example decoded texture image stacks 345 that correspond to the texture image stacks 325, and associated example decoded alpha image stacks 350 that correspond to the alpha image stacks 330, with the decoded texture images 345 formatted in YUV format. In the illustrated example, the MPI stack decoder 320 converts the decoded texture image stacks 345 and associated decoded alpha image stacks 350 into example decoded MPI stacks 355 that correspond to the MPI stacks 130 and 135. The decoded MPI stacks 355 include texture images with pixels formatted in RGB format. As described above, the MPI stack renderer 200 renders the decoded MPI stacks to output example target images 360 corresponding to a desired target viewpoint.

Figure 4:
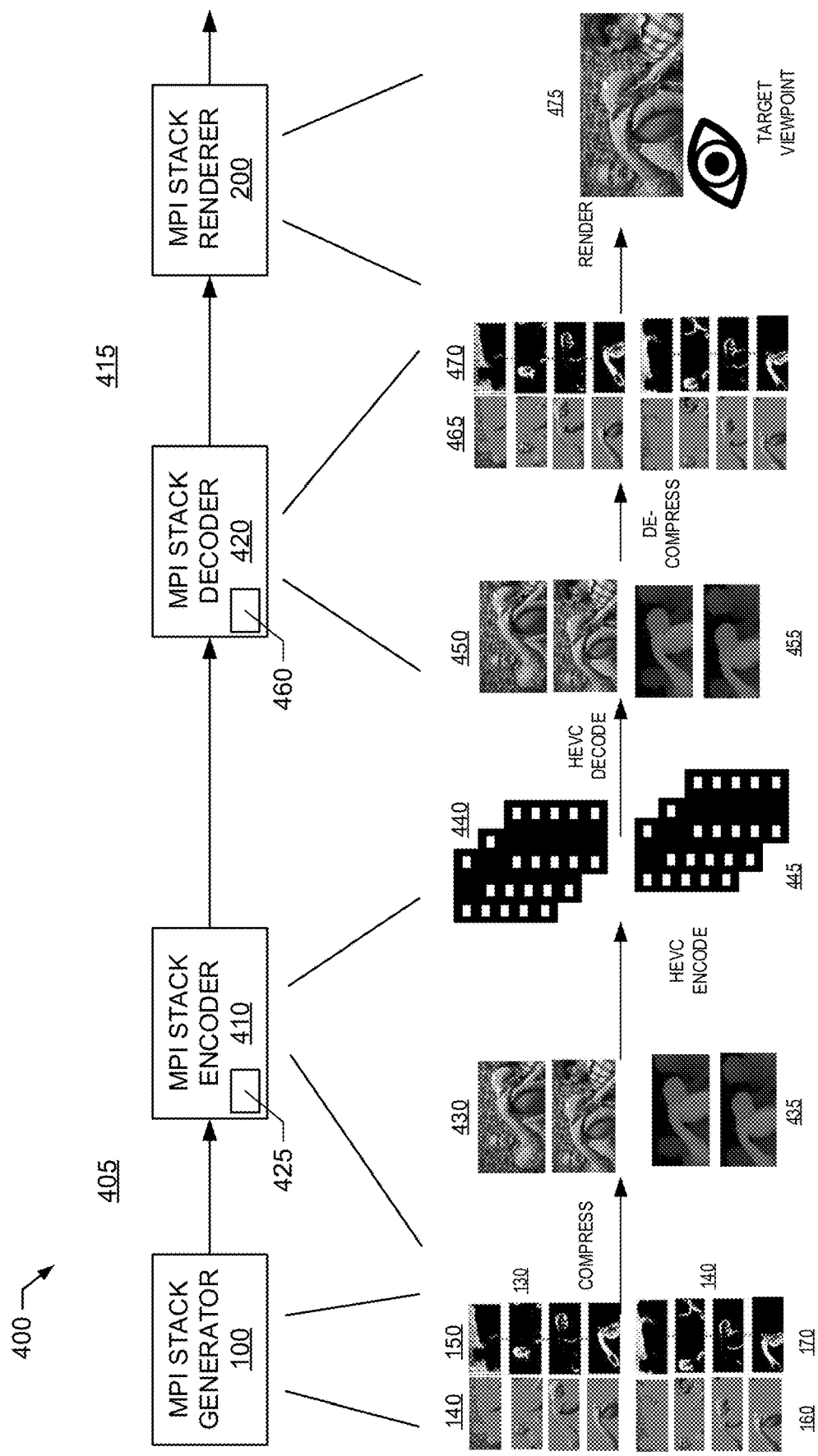
FIG. 4 is a block diagram of an example video encoding and decoding system including an example MPI stack encoder and an example MPI stack decoder to implement MPI compression in accordance with teachings of this disclosure.

A block diagram of an example video encoding and decoding system 400 to implement MPI compression in accordance with teachings of this disclosure is illustrated in FIG. 4. The video encoding and decoding system 400, also referred to as the video system 400, of the illustrated example includes an example source platform 405, which includes the MPI stack generator 100 and an example MPI stack encoder 410, and an example target platform 415, which includes an example MPI stack decoder 420 and the MPI renderer 200. The source platform 405 can be implemented by any computing platform/device, such as, but not limited to, one or more servers, personal computers, workstation, mobile devices (e.g., a cell phone, a smart phone, a tablet such as an iPad™), a PDA, an Internet appliance, a camera, etc. In some examples, the source platform 405 is implemented by the example processor platform 1900 of FIG. 19, which is described in further detail below. Similarly, the target platform 415 can be implemented by any computing platform/device, such as, but not limited to, one or more servers, personal computers, workstation, mobile devices (e.g., a cell phone, a smart phone, a tablet such as an iPad™), a PDA, an Internet appliance, a DVD player, a CD player, a digital video recorder, a Blu-ray player, a gaming console, a personal video recorder, a set top box, etc. In some examples, the target platform 415 is implemented by the example processor platform 2000 of FIG. 20, which is described in further detail below.

In the illustrated example of FIG. 4, an MPI stack corresponding to an input image frame is not directly encoded and transmitted. Instead, a single composite texture image and/or a single composite alpha image, which capture much of the useful information from the MPI stack, are generated and stored/transmitted by the source platform 405. At the target platform 415, the single composite texture image and single composite alpha image are used to re-generate the MPI stack, which is then employed for image rendering.

More specifically, in the illustrated example of FIG. 4, the MPI stack generator 100 of the source platform 405 generates, as described above, respective MPI stacks, such as the MPI stacks 130 and 135, for each input video frame to be encoded and stored/transmitted by the source platform 405. The MPI stack encoder 410 of the illustrated example includes an example MPI compressed image encoder 425 to compress each of the MPI stacks 130/135 by converting each of the texture image stacks 140/160 into corresponding, example single composite texture images 430, and/or converting each of the alpha image stacks 150/170 into corresponding, example single composite alpha images 435. In some examples, the MPI compressed image encoder 425 performs compression of both the texture image stacks 140/160 and the alpha image stacks 150/170 to form the respective single composite texture images 430 and single composite alpha images 435. However, in some examples, the MPI compressed image encoder 425 performs compression of either the texture image stacks 140/160 to form the respective single composite texture images 430 or the alpha image stacks 150/170 to form the respective single composite alpha images 435, but not both. Accordingly, the MPI compressed image encoder 425 is an example of means for encoding an MPI stack (e.g., such as the MPI stacks 130/135) in a manner that involves one or both of (i) converting the texture images of the MPI stack (e.g., such as the texture image stacks 140/160) to a single composite texture image (e.g., such as the single composite texture images 430) to generate a compressed multiplane image stack, and/or (ii) converting the alpha images of the MPI stack (e.g., such as the alpha image stacks 150/170) to a single composite alpha image (e.g., such as the single composite alpha images 435) to generate the compressed multiplane image stack.

The MPI stack encoder 410 of the illustrated example encodes the single composite texture images 430 and single composite alpha images 435 using any video encoder, such as an encoder implementing HEVC, to create example encoded texture video frames 440 and example encoded alpha video frames 445. The MPI stack encoder 410 then stores the encoded texture video frames 440 and the encoded alpha video frames 445 and/or transmits the encoded texture video frames 440 and the encoded alpha video frames 445 to the target platform 415.

In the illustrated example of FIG. 4, the MPI stack decoder 420 of the target platform 415 decodes the received or otherwise accessed encoded texture video frames 440 and encoded alpha video frames 445 using an appropriate video decoder, such as decoder implementing HEVC decoding, associated with the video encoder utilized by the MPI stack encoder 410. The results of such video decoding are example decoded composite texture images 450 that correspond to the composite texture images 430, and associated example decoded composite alpha images 455 that correspond to the composite alpha images 435. In the illustrated example, the MPI stack decoder 420 includes an example MPI compressed image decoder 460 to decompress the decoded composite texture images 450 by converting the decoded composite texture images 450 into respective decoded texture image stacks 465 to include in corresponding decoded MPI stacks. Additionally or alternatively, the MPI compressed image decoder 460 decompresses the decoded composite alpha images 455 by converting the decoded composite alpha images 455 into respective decoded alpha image stacks 470 to include in the corresponding decoded MPI stacks. Accordingly, the MPI compressed image encoder 425 is an example of means for decoding a compressed MPI stack in a manner that involves one or both of (i) uncompressing a single composite texture image (e.g., such as a composite texture image 450) to obtain the uncompressed texture images of the uncompressed MPI stack (e.g., such as a decoded texture image stack 465), and/or (ii) uncompressing a single composite alpha image (e.g., such as a composite alpha image 455) to obtain uncompressed alpha images of the uncompressed MPI stack (e.g., such as a decoded alpha image stack 470). As described above, the MPI stack renderer 200 renders the decoded MPI stacks to output example target images 475 corresponding to a desired target viewpoint.

In some examples, a single composite texture frame is derived by the MPI compressed image encoder 425 from the texture component of the stack of textures frames in the MPI stack in a manner to capture sufficient texture information for use by the MPI stack renderer 200. In other examples, the single composite texture frame is derived by the MPI compressed image encoder 425 directly from the original camera image. In either type of example, the target image is rendered on the target platform 415 by replicating this single composite texture frame N (e.g., N=32) times and employing the replicated texture frames in place of the actual stack of texture frames included in the original MPI stack, along with the N (e.g., N=32) alpha planes generated by the machine learning model.

In some examples, a single composite alpha image is derived by the MPI compressed image encoder 425 from the alpha components of the stack of alpha frames in the MPI stack in a manner to capture sufficient alpha (transparency) information for use by the MPI stack renderer 200. In other examples, the single composite alpha image is derived by the MPI compressed image encoder 425 from a depth map obtained from a source camera associated with the input MPI stack. In either type of example, the target image is rendered on the target platform 415 by using the single composite alpha image to generate an approximation to the original N (e.g., N=32) stack of alpha frames included in the original MPI stack.

In some examples, the single composite texture image and the single composite alpha image may be used singly or in combination. For example, the single texture frame and the set of N (e.g., N=32) alpha planes from the MPI stack may be stored/transmitted, or the set of N (e.g., N=32) texture planes and single composite alpha image may be stored/transmitted, or the single composite texture image and single composite alpha image may be stored/transmitted. In some examples, the single composite texture image and the single composite alpha image may be used directly to project the single composite texture image to a target viewpoint by interpreting the single composite alpha image as a coarse depth map.

Figure 5:
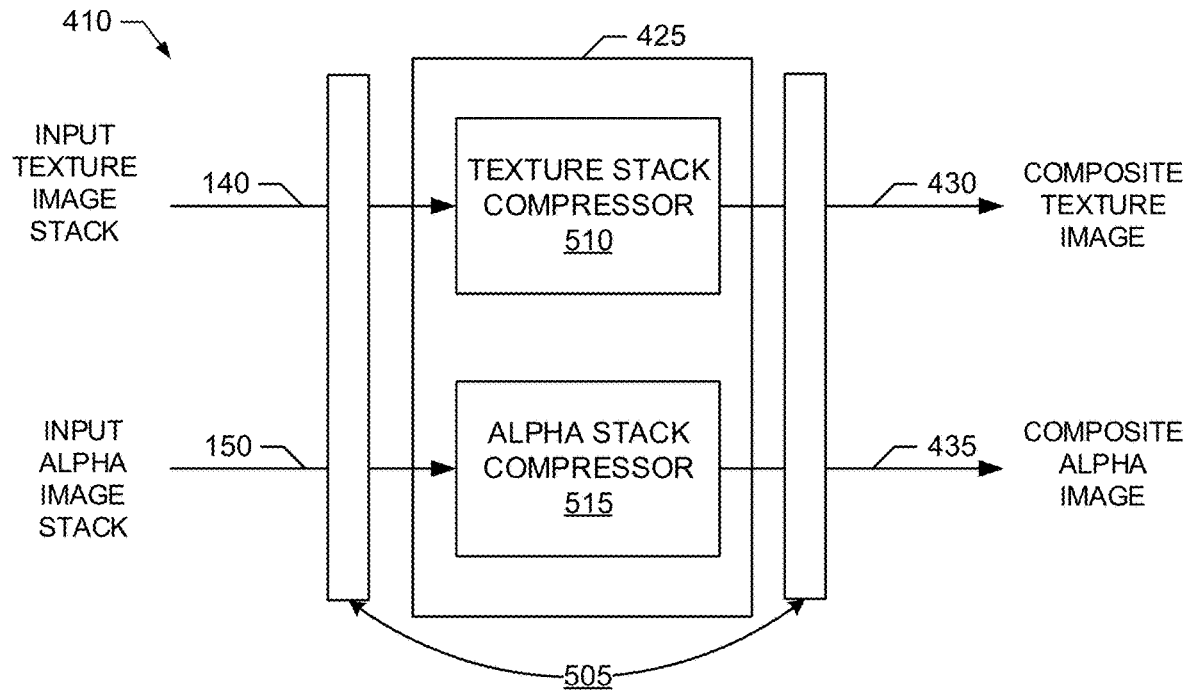
FIG. 5 is a block diagram of an example implementation of the MPI stack encoder of FIG. 4.

A block diagram of an example implementation of the MPI stack encoder 410 of FIG. 4 is illustrated in FIG. 5. The example MPI stack encoder 410 of FIG. 5 includes the example MPI compressed image encoder 425 and an example data interface 505. The example MPI compressed image encoder 425 of FIG. 5 includes an example texture stack compressor 510 and an example alpha stack compressor 515.

In the illustrated example of FIG. 5, the data interface 505 is to access an input MPI stack corresponding to a source camera viewpoint. As described above, the input MPI stack includes an example stack of texture images/planes, such as the input texture image stack 140, and a corresponding example stack of alpha images/planes, such as the input alpha image stack 150. As also described above, each one of the alpha images in the input alpha image stack 150 includes pixel values representative of transparency of corresponding pixels in the respective paired one of the texture images in the input texture image stack 140. Accordingly, the data interface 505 is an example of means for accessing an input multiplane image stack corresponding to a source camera viewpoint.

In the illustrated example of FIG. 5, the MPI compressed image encoder 425 includes the texture stack compressor 510 to convert the texture images of the input texture image stack 140 to a single composite texture image, such as the single composite texture image 430. In the illustrated example of FIG. 5, the MPI compressed image encoder 425 includes the alpha stack compressor 515 to convert the alpha images of the input alpha image stack 150 to a single composite alpha image, such as the single composite alpha image 435. In the illustrated example, the data interface 505 outputs the single composite texture image 430 and the single composite alpha image 435 as a compressed MPI stack corresponding to the input MPI stack. Accordingly, the data interface 505 is an example of means for outputting a compressed MPI stack.

Figure 6:
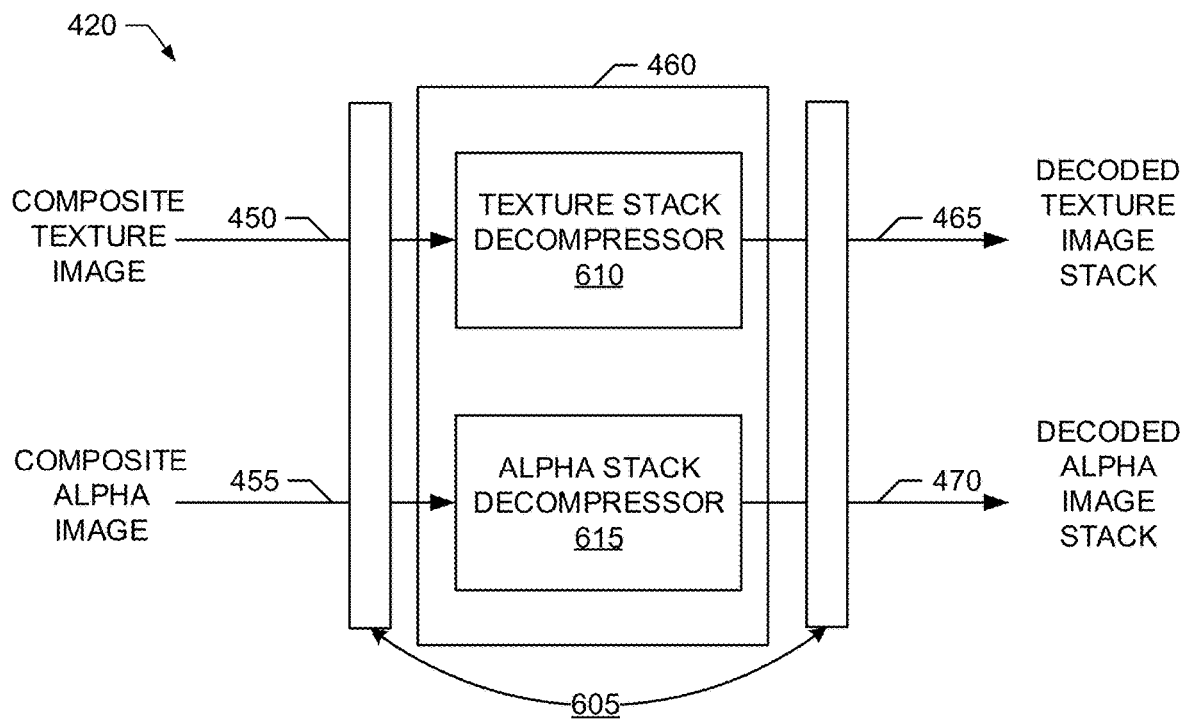
FIG. 6 is a block diagram of an example implementation of the MPI stack decoder of FIG. 4.

A block diagram of an example implementation of the MPI stack decoder 420 of FIG. 4 is illustrated in FIG. 6. The example MPI stack decoder 420 of FIG. 6 includes the example MPI compressed image decoder 460 and an example data interface 605. The example MPI compressed image decoder 460 of FIG. 6 includes an example texture stack decompressor 610 and an example alpha stack decompressor 615.

In the illustrated example of FIG. 6, the data interface 605 is to access an input, compressed multiplane image stack, which corresponds to a source camera viewpoint. As described above in connection with FIG. 5, the compressed multiplane image stack includes (i) a single composite texture image, such as the composite texture image 450, which is to be decompressed to represent uncompressed texture images to be included in a decoded texture image stack, such as the decoded texture image stack 465, and/or (ii) a single composite alpha image, such as the single composite alpha image 455, which is to be decompressed to represent a uncompressed alpha images to be included in a decoded alpha image stack, such as the decoded alpha image stack 470. As described above, each one of the uncompressed alpha images includes pixel values representative of transparency of corresponding pixels in the respective paired one of the uncompressed texture images. Accordingly, the data interface 605 is an example of means for accessing a compressed multiplane image stack corresponding to a source camera viewpoint.

In the illustrated example of FIG. 6, the MPI compressed image decoder 460 includes the texture stack decompressor 610 to uncompress the single composite texture image 450 to obtain the uncompressed texture images to include in the decoded texture image stack 465. In the illustrated example of FIG. 5, the MPI compressed image decoder 460 includes the alpha stack decompressor 615 to uncompress the single composite alpha image 455 to obtain the uncompressed alpha images to include in the decoded alpha image stack 470. In the illustrated example, the data interface 605 outputs a decoded (uncompressed) MPI stack including the decoded texture image stack 465 and the decoded alpha image stack 470. Accordingly, the data interface 605 is an example of means for outputting an uncompressed MIP stack including uncompressed texture images (e.g., such as the uncompressed texture images of the decoded texture image stack 465) and uncompressed alpha images (e.g., such as the uncompressed alpha images included in the decoded alpha image stack 470).

Returning to FIG. 5, in some examples, the texture stack compressor 510 converts the texture images of the input texture image stack 140 to the single composite texture image 430 at the source platform 405 based on the observation that, for each pixel position, the alpha values are large for only a few alpha planes in the input alpha image stack 150 corresponding to the input texture image stack 140. As such, for that pixel position, the texture values for the texture planes corresponding to the few alpha planes with the large alpha values will have the most impact in the rendered target image. To take advantage of this observation, in some examples, the texture stack compressor 510 generates the single composite texture image 430 to have pixel values that are alpha-weighted averages of the texture values over the texture images included in the input texture image stack 140.

Mathematically, the foregoing example operation of the texture stack compressor 510 can be expressed as follows. For pixel position i, the texture pixel value $p_{i,j}$ in the single composite texture image 430 is defined by Equation 1, which is:

$$p_{i,j} = \text{round}\left(\frac{\sum_{j=0}^{31} t_{i,j}\alpha_{i,j}}{\sum_{j=0}^{31} \alpha_{i,j}}\right) \quad \text{Equation 1}$$

In Equation 1, j=[0 . . . 31] is the index over the texture images (planes) in the input texture image stack 140, $t_{i,j}$ is the texture (e.g., R,G,B) component at pixel position i in plane j, $\alpha_{i,j}$ is the alpha value of pixel position i in plane j, and the round( ) operation converts the fractional argument to the nearest integer.

Figure 7:
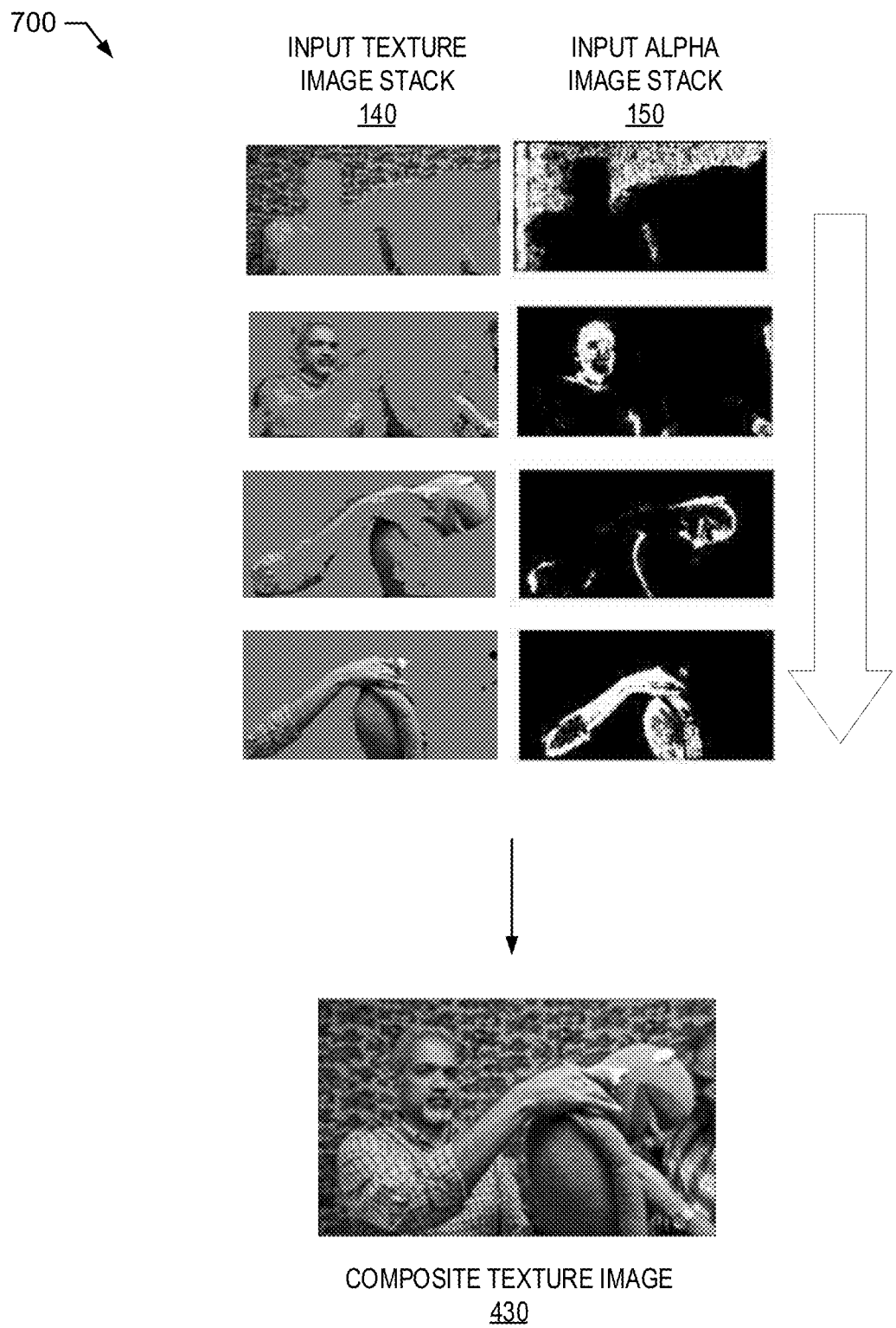
FIG. 7 illustrates an example MPI texture stack compression operation performed by the MPI stack encoder of FIGS. 4 and/or 5.

FIG. 7 illustrates an example MPI texture stack compression operation 700 performed by the texture stack compressor 510 included in the MPI stack encoder 410 of FIG. 5. In the illustrated example operation 700, the texture stack compressor 510 processes the input texture image stack 140 and the input alpha image stack 150 of the input MPI stack according to Equation 1 to generate the single composite texture image 430 to have alpha-weighted averages of the texture values over the input texture image stack 140.

Figure 8:
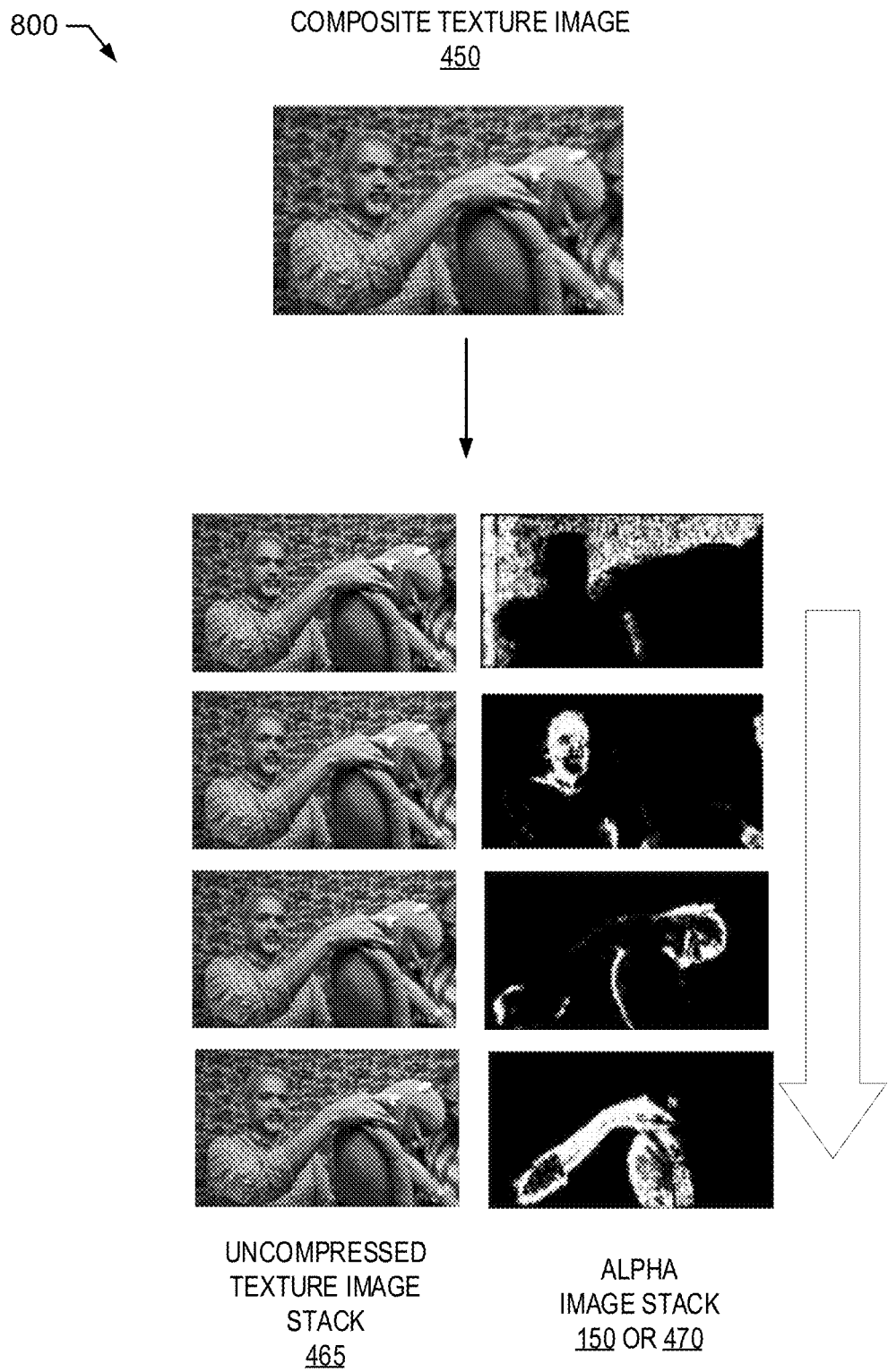
FIG. 8 illustrates an example MPI texture stack decompression operation performed by the MPI stack decoder of FIGS. 4 and/or 6.

Returning to FIG. 6, the texture stack decompressor 610 uncompresses the single composite texture image 450 at the target platform 415 by replicating the single composite texture image 450 a number N (e.g., N=32) times to obtain the uncompressed texture images to include in the uncompressed texture image stack 465 of the decoded MPI stack. FIG. 8 illustrates a corresponding example MPI texture stack decompression operation 800 performed by the texture stack decompressor 610 of the MPI stack decoder 420. In the illustrated example operation 800, the texture stack decompressor 610 replicates the single composite texture image 450 to obtain the uncompressed texture image stack 465. In the illustrated example, the corresponding alpha image stack obtained at the target platform can be the uncompressed alpha image stack 470 generated by the alpha stack decompressor 615 or the original input alpha image stack 150.

As can be seen from the preceding examples, the composite texture image 430/450 may be similar to the original texture image frame from source camera. As such, in some examples, texture stack compressor 510 included in the MPI stack encoder 410 uses the original texture image frame from the source camera as the composite texture image 430/450.

Returning to FIG. 5, in some examples, the alpha stack compressor 515 converts the alpha images of the input alpha image stack 150 to the single composite alpha image 435 at the source platform 405 based on the observation that, for each pixel position, the alpha values are large for only a few alpha planes in the input alpha image stack 150. To take advantage of this observation, in some examples, the alpha stack compressor 515 generates the single composite alpha image 435, also referred to as an alpha map, to encode a subset of the alpha planes for which the values of alpha are large, as well as those alpha values.

In some such examples, the alpha stack compressor 515 generates the single composite alpha image 435 (alpha map) to capture the location and magnitude of the alpha plane with the largest alpha value, and that of the neighboring alpha plane with the next largest alpha value. Mathematically, the alpha plane with the largest value of alpha at pixel position i is designated as $p_{i,m}$, and the corresponding alpha value $a_{i,m}$. The neighboring plane with the next largest alpha value is $p_{i,m}+1$ or $p_{i,m}-1$, with an alpha value of $a_{i,2}$. A bias value $b_i$ for pixel position i is defined by Equation 2, which is:

$$b_i = \pm \frac{a_{i,2}}{(a_{i,m} + a_{i,2})} * 8 \qquad \text{Equation 2}$$

In Equation 2, the positive sign is used if the neighboring plane with the next largest alpha value is $p_m+1$, otherwise the term is negative is the neighboring plane with the next largest alpha value is $p_m-1$. The composite alpha value $d_i$ at pixel position i in the composite alpha image 435 (alpha map) is then given by Equation 3, which is:

$$d_i = 8 * p_{i,m} + b_i \qquad \text{Equation 3}$$

For example, if one pixel position i has a largest alpha value of 200 in the alpha plane corresponding to alpha plane index=10 and a next largest alpha value of 60 in the alpha plane corresponding to alpha plane index=9, the alpha plane index of the plane with the largest alpha value will be 10. The bias factor has a negative sign since plane 9 is less than plane 10. The bias value $b_i$ will a value of 2 to represent 8*60/260 (where 8 corresponds to 8 bits of precision). So, the resulting composite alpha value $d_i$ at pixel position i in this example would be 8*10+(−2)=78.

In some examples, some pixel locations do not have any significant alpha values across the planes. In some examples, some pixels are even completely transparent across all alpha planes. Such counter-intuitive sets of pixels can an artifact of the machine-learning model used to generate MPI stack. These pixels, while somewhat infrequent, should be maintained to indicate a low prediction probability amongst the views. To take these pixels into account, pixel values 0 to 7 are used to map these range of pixel values. For example, a composite alpha value $d_i$ of 0 may be used to represent a pixel location that is completely transparent. In some examples, composite alpha value values from 1 to 7 are used to indicate a range of the maximum value across the two planes such that the higher the composite alpha value the higher the maximum value for the two maximum planes at that pixel position.

In some examples, the alpha stack compressor 515 filters the resulting single composite alpha image 435 (alpha map) with a smoothing filter to reduce the bitrate for transmission, with an associated cost of a small reduction in accuracy.

Returning to FIG. 6, in some examples, the alpha stack decompressor 615 uncompresses the single composite alpha image 455 (alpha map) at the target platform 415 as follows. Assuming the single composite alpha image 455 is generated based on Equations 2-4 as described above, the alpha stack decompressor 615 uses the single composite alpha image 455 (alpha map) to approximately reconstruct the N (e.g., N=32) alpha images of the uncompressed alpha image stack 470 as follows. Given the composite alpha value $d_i$ at pixel position i in the composite alpha image 435 (alpha map), which is defined by Equation 4 above, the alpha stack decompressor 615 computes the following values given by Equations 5 and 6, which are:

$$\hat{p}_{i,m} = \text{round}\left(\frac{d_i}{8}\right) \qquad \text{Equation 5}$$

$$\hat{b}_i = d_i - \hat{p}_{i,m} * 8 \qquad \text{Equation 6}$$

If $\hat{b}_i$ is positive, the alpha stack decompressor 615 sets the decoded neighbor plane for pixel position i to $\hat{p}_{i,m}+1$, otherwise the neighbor plane is set to $\hat{p}_{i,m}-1$. Next, for the pixel position i, the alpha stack decompressor 615 computes the following values given by Equations 7 and 8, which are:

$$\hat{a}_{i,2} = \Gamma * |\hat{b}_i| \qquad \text{Equation 7}$$

$$\hat{a}_{i,m} = 255 - \hat{a}_{i,2} \qquad \text{Equation 8}$$

The alpha stack decompressor 615 sets the alpha value at pixel position i in alpha plane $\hat{p}_{i,m}$ to $\ddot{a}_{i,m}$, and sets the alpha value at pixel position i in the neighboring plane is set to as defined above. The alpha stack decompressor 615 sets the alpha values at pixel position i in the other alpha images of the uncompressed alpha image stack 470 to zero.

The example implementations of that alpha stack compressor 515 and the alpha stack decompressor 615 based on Equations 2-8 correspond to a special case of the following example implementation. For pixel position i, the value in the composite alpha image (alpha map) is defined by Equation 9, which is:

$$d_i = \frac{\sum_{j=0}^{31} j \alpha_{i,j}}{\sum_{j=0}^{31} \alpha_{i,j}} \qquad \text{Equation 9}$$

In Equation 9, j=[0 . . . 31] is the index over the alpha images (planes) in the input alpha image stack 150, and $a_{i,j}$ is the alpha value at pixel position i in alpha plane j. When only two neighboring planes j and j+1 have non-zero alpha values, Equation 9 reduces to Equation 10, which is:

$$d_i = j + \frac{\alpha_{i,j+1}}{\alpha_{i,j} + \alpha_{i,j+1}} \qquad \text{Equation 10}$$

In Equation 10, $d_i$ has a fractional value. Because j is in the range of [0 . . . 31], $d_i$ can be scaled by the value 8 to allow use of the full 8-bit range [0 . . . 255] and then rounded to an integer, as given by Equation 11, which is:

$$d_i = \text{round}\left(8 * j + 8 * \frac{\alpha_{i,j+1}}{\alpha_{i,j} + \alpha_{i,j+1}}\right). \qquad \text{Equation 11}$$

At the decoder side, the assuming $a_{i,j} + a_{i,j+1} = 255$, Equations 5-8 described above provide the reconstruction.

In some examples, the depth map from the source camera may be used by the alpha stack compressor 515 at the encoder side to generate the single composite alpha image 435 (alpha map) to replace input alpha image stack 150. In a first example implementation based on the depth map from the source camera, which is illustrated by the example operation 900 of FIG. 9, assume the N=32 alpha planes are uniformly spaced in the numeric range [0 . . . 65535] corresponding to a 16-bit depth map, with a gap of I=65535/31 between each plane. A pixel with depth d (represented by reference numeral 905 in FIG. 9) in a 16-bit depth map will lie between alpha plane j (represented by reference numeral 910 in FIG. 9) and alpha plane j+1 (represented by reference numeral 910 in FIG. 9), where the value of j is given by Equation 12, which is:

$$j = \text{floor}\left(\frac{d}{I}\right)$$ Equation 12

In this example, the alpha stack compressor 515 calculates the composite alpha value at pixel position i according to Equation 13, which is:

$$d_i = \text{round}\left(8 * j + 8 * \frac{d_j}{I}\right)$$ Equation 13

Figure 9:
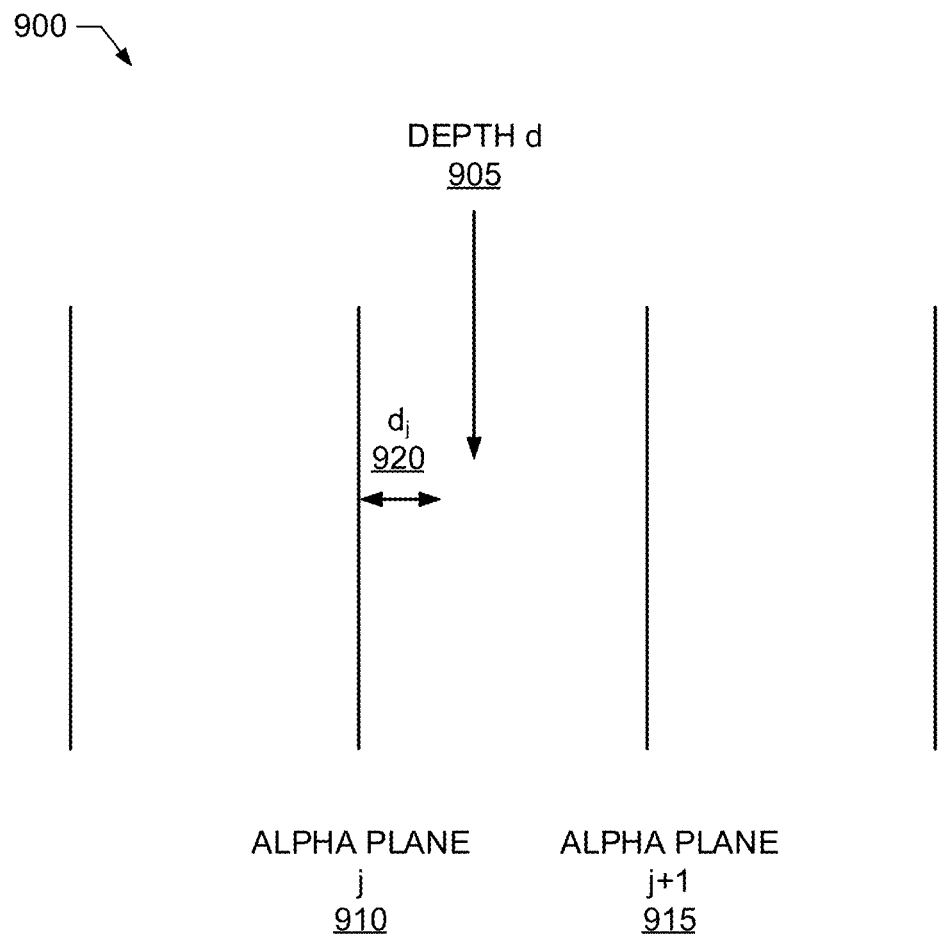
FIG. 9 illustrates an example MPI alpha stack compression operation performed by the MPI stack encoder of FIGS. 4 and/or 5.

In Equation 13, $d_j=d-j*I$ (where $d_j$ is represented by reference numeral 920 in FIG. 9).

In a second example implementation based on the depth map from the source camera, the alpha stack compressor 515 transmits the depth map to the decode side. The alpha stack decompressor 615 at the decode side initially sets the alpha values of a stack of N=32 uncompressed alpha planes to zero. With reference to FIG. 9 and the description of the first example implementation above, a pixel with depth d (represented by reference numeral 905 in FIG. 9) in a 16 bit depth map will lie between alpha plane j (represented by reference numeral 910 in FIG. 9) and alpha plane j+1 (represented by reference numeral 910 in FIG. 9), where the value of j is given by Equation 12. The alpha stack decompressor 615 at the decode side computes the values $d_j$ and $d_{j+1}$ according to Equations 14 and 15, which are:

$$d_j = d - j*I$$ Equation 14

$$d_{j+1} = I - d_j$$ Equation 15

The alpha stack decompressor 615 then sets the value of pixel i in alpha plane j, which is denoted by $a_{i,j}$, and the value of pixel i in alpha plane j+1, which is denoted by $a_{i,j+1}$, according to Equations 16 and 17, which are:

$$a_j = 255 \frac{d_{j+1}}{I}$$ Equation 16

$$a_{j+1} = 255 - a_j$$ Equation 17

In a third example implementation based on the depth map from the source camera, the alpha stack compressor 515 adds a preprocessing step to the first example implementation described above. In this example, the alpha stack compressor 515 applies k-means clustering to the 16-bit depth map from the camera, where k=32, to generate alpha-planes at locations in the depth range that best match the objects in the scene. The depths of the alpha-planes (corresponding to where the centroids generated by k-means clustering are found) are transmitted to the target platform (decoding side) as metadata. This allows the encoding technique used in the first example implementation described above to more accurately approximate the true depth d.

In a fourth example implementation based on the depth map from the source camera, the alpha stack compressor 515 transmits the original 16-bit depth map to the decoder. In some examples, the alpha stack compressor 515 reduces the precision of the depth map to use fewer bits, such as a 10-bits or some other value. At the decoder, the depth map is used to directly warp (e.g., re-project) the texture frame from the source camera to the frame of the target viewpoint. This fourth example implementation may obviate the use of the MPI stack and, thus, avoid the use of the machine learning model described above.

While an example manner of implementing the video encoding and decoding system 400 is illustrated in FIGS. 4-6, one or more of the elements, processes and/or devices illustrated in FIGS. 4-6 may be combined, divided, re-arranged, omitted, eliminated and/or implemented in any other way. Further, the example MPI stack generator 100, the example MPI renderer 200, the example source platform 405, the example MPI stack encoder 410, the example target platform 415, the example MPI stack decoder 420, the example MPI compressed image encoder 425, the example MPI compressed image decoder 460, the example data interface 505, the example texture stack compressor 510, the example alpha stack compressor 515, the example data interface 605, the example texture stack decompressor 610, the example alpha stack decompressor 615 and/or, more generally, the example video encoding and decoding system 400 of FIGS. 4-6 may be implemented by hardware, software, firmware and/or any combination of hardware, software and/or firmware. Thus, for example, any of the example MPI stack generator 100, the example MPI renderer 200, the example source platform 405, the example MPI stack encoder 410, the example target platform 415, the example MPI stack decoder 420, the example MPI compressed image encoder 425, the example MPI compressed image decoder 460, the example data interface 505, the example texture stack compressor 510, the example alpha stack compressor 515, the example data interface 605, the example texture stack decompressor 610, the example alpha stack decompressor 615 and/or, more generally, the example video encoding and decoding system 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example MPI stack generator 100, the example MPI renderer 200, the example source platform 405, the example MPI stack encoder 410, the example target platform 415, the example MPI stack decoder 420, the example MPI compressed image encoder 425, the example MPI compressed image decoder 460, the example data interface 505, the example texture stack compressor 510, the example alpha stack compressor 515, the example data interface 605, the example texture stack decompressor 610, the example alpha stack decompressor 615 and/or, more generally, the example video encoding and decoding system 400 is/are hereby expressly defined to include a non-transitory computer readable storage device or storage disk such as a memory, a digital versatile disk (DVD), a compact disk (CD), a Blu-ray disk, etc. including the software and/or firmware. Further still, the example video encoding and decoding system 400 may include one or more elements, processes and/or devices in addition to, or instead of, those illustrated in FIGS. 4-6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the MPI stack encoder 410 are shown in FIGS. 10-14. In these examples, the machine readable instructions may be one or more executable programs or portion(s) of an executable program for execution by a computer processor and/or processor circuitry, such as the processor 1912 shown in the example processor platform 1900 discussed below in connection with FIG. 19. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 1912, but the entire program or programs and/or parts thereof could alternatively be executed by a device other than the processor 1912 and/or embodied in firmware or dedicated hardware. Further, although the example program(s) is(are) described with reference to the flowcharts illustrated in FIGS. 10-14, many other methods of implementing the example MPI stack encoder 410 may alternatively be used. For example, with reference to the flowcharts illustrated in FIGS. 10-14, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 15:
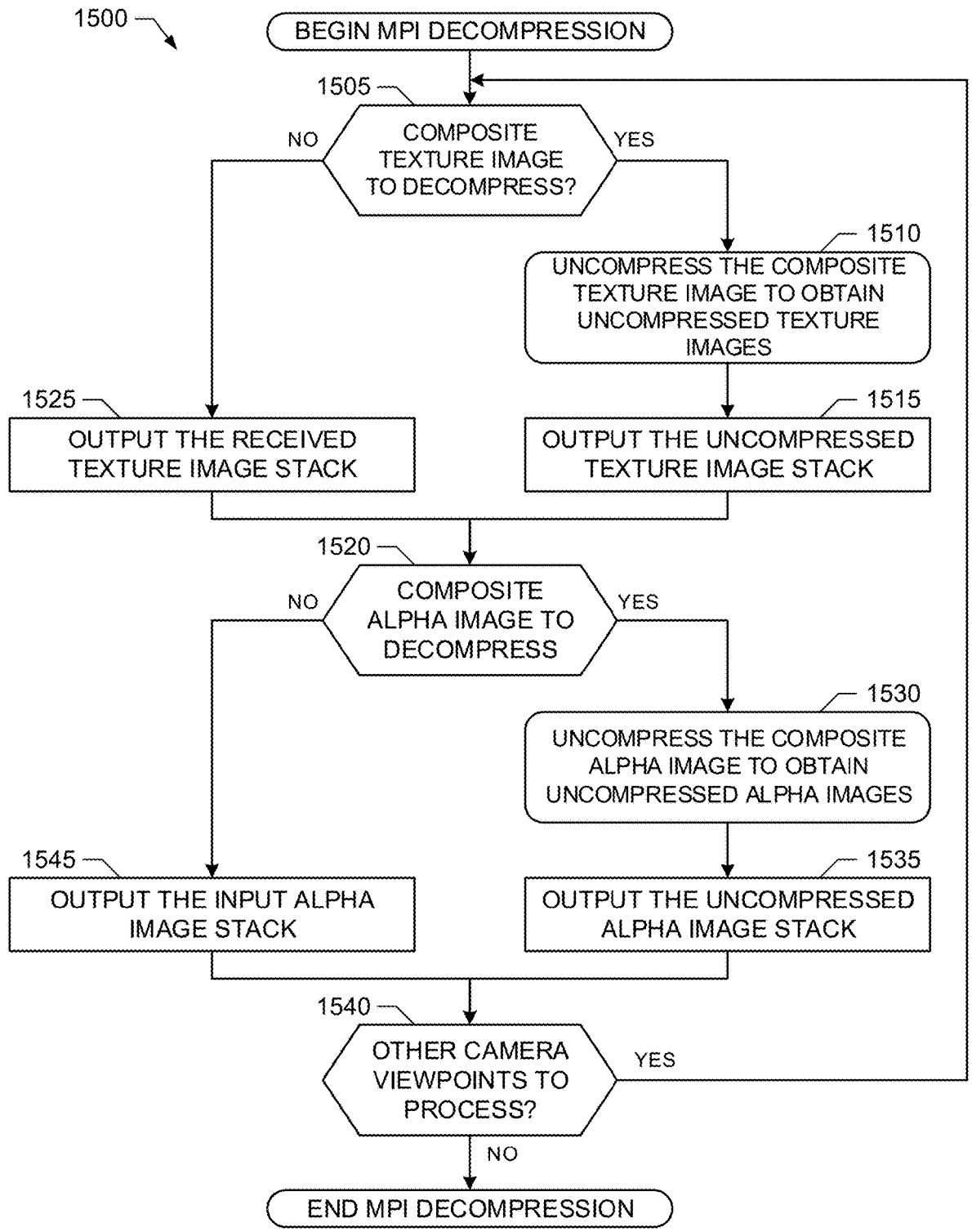
FIGS. 15-17 are flowcharts representative of example computer readable instructions that may be executed to implement the MPI stack decoder of FIGS. 4 and/or 6.
Figure 16:
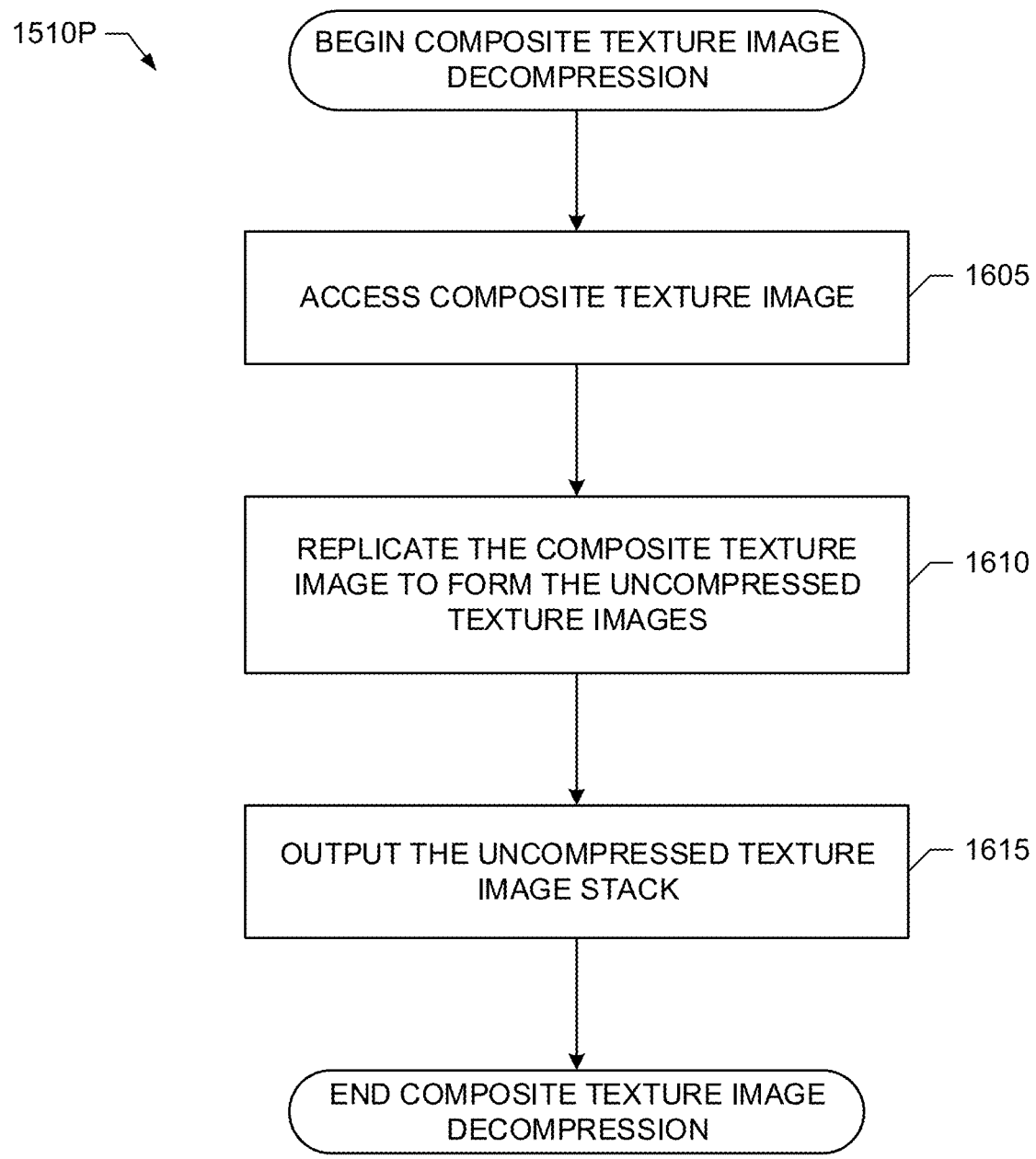
Figure 17:
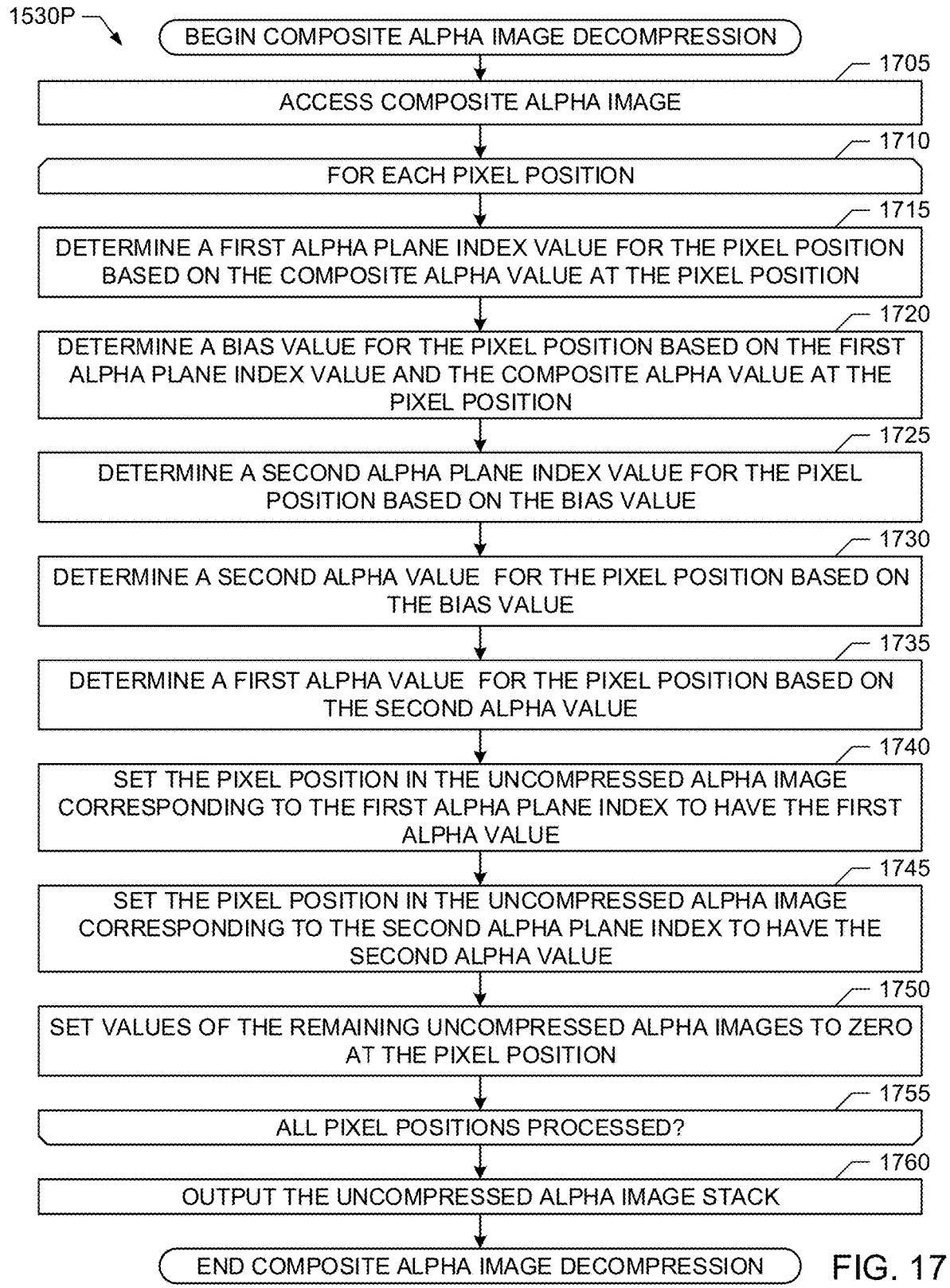

Flowcharts representative of example hardware logic, machine readable instructions, hardware implemented state machines, and/or any combination thereof for implementing the MPI stack decoder 420 are shown in FIGS. 15-17. In these examples, the machine readable instructions may be one or more executable programs or portion(s) of an executable program for execution by a computer processor and/or processor circuitry, such as the processor 2012 shown in the example processor platform 2000 discussed below in connection with FIG. 20. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 2012, but the entire program or programs and/or parts thereof could alternatively be executed by a device other than the processor 2012 and/or embodied in firmware or dedicated hardware. Further, although the example program(s) is(are) described with reference to the flowcharts illustrated in FIGS. 15-17, many other methods of implementing the example MPI stack decoder 420 may alternatively be used. For example, with reference to the flowcharts illustrated in FIGS. 15-17, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10-17 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 10:
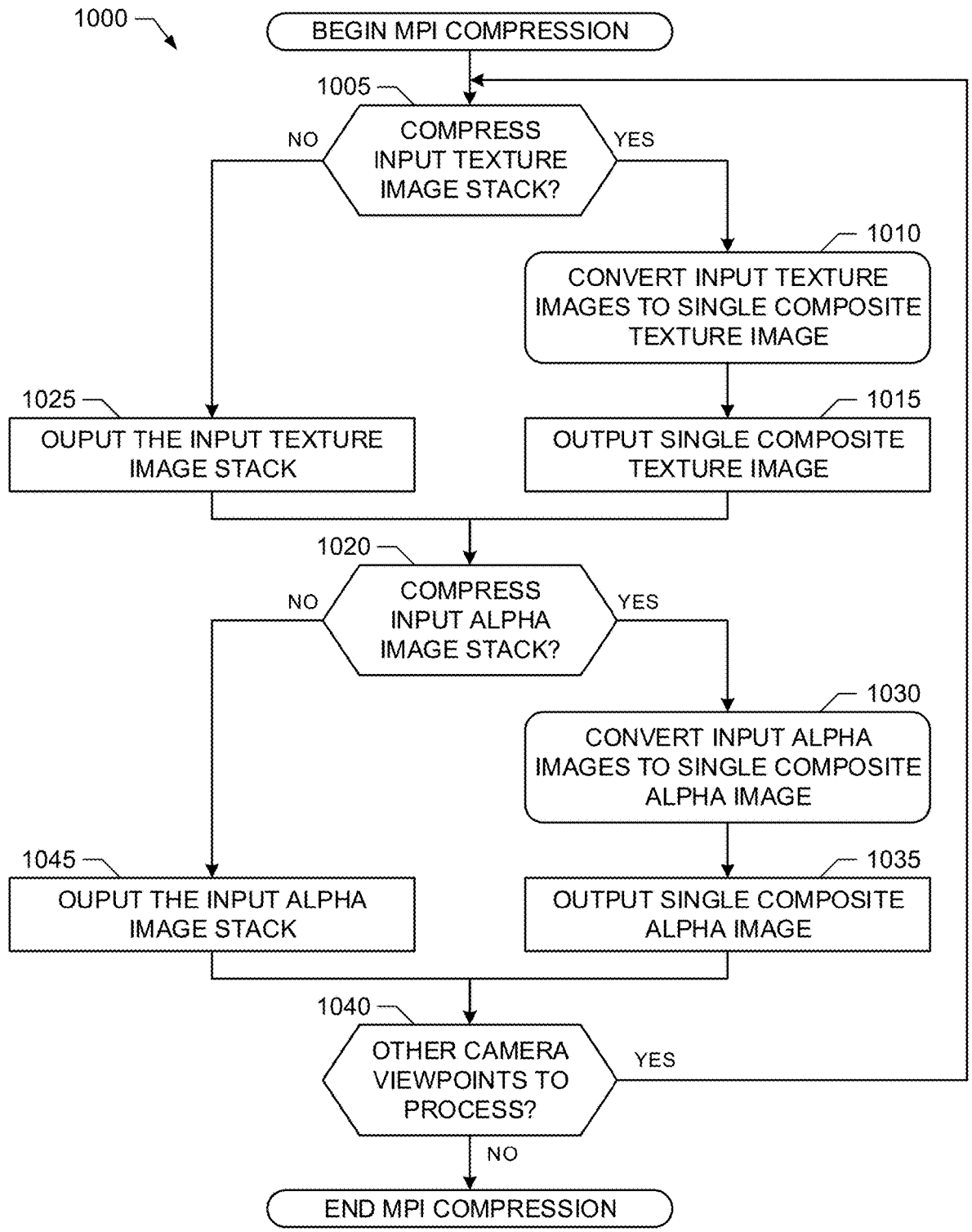
FIGS. 10-14 are flowcharts representative of example computer readable instructions that may be executed to implement the MPI stack encoder of FIGS. 4 and/or 5.
Figure 11:
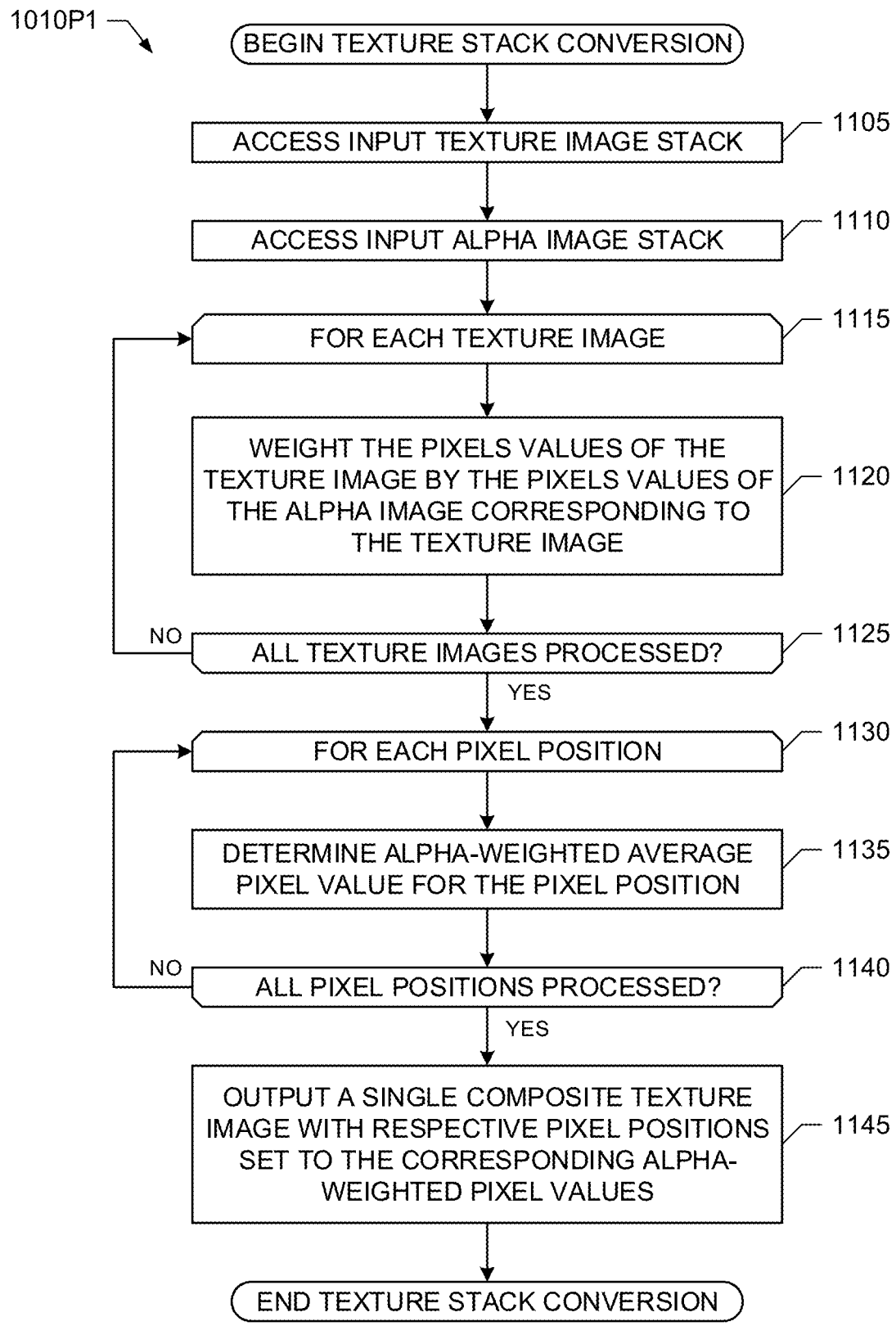
Figure 12:
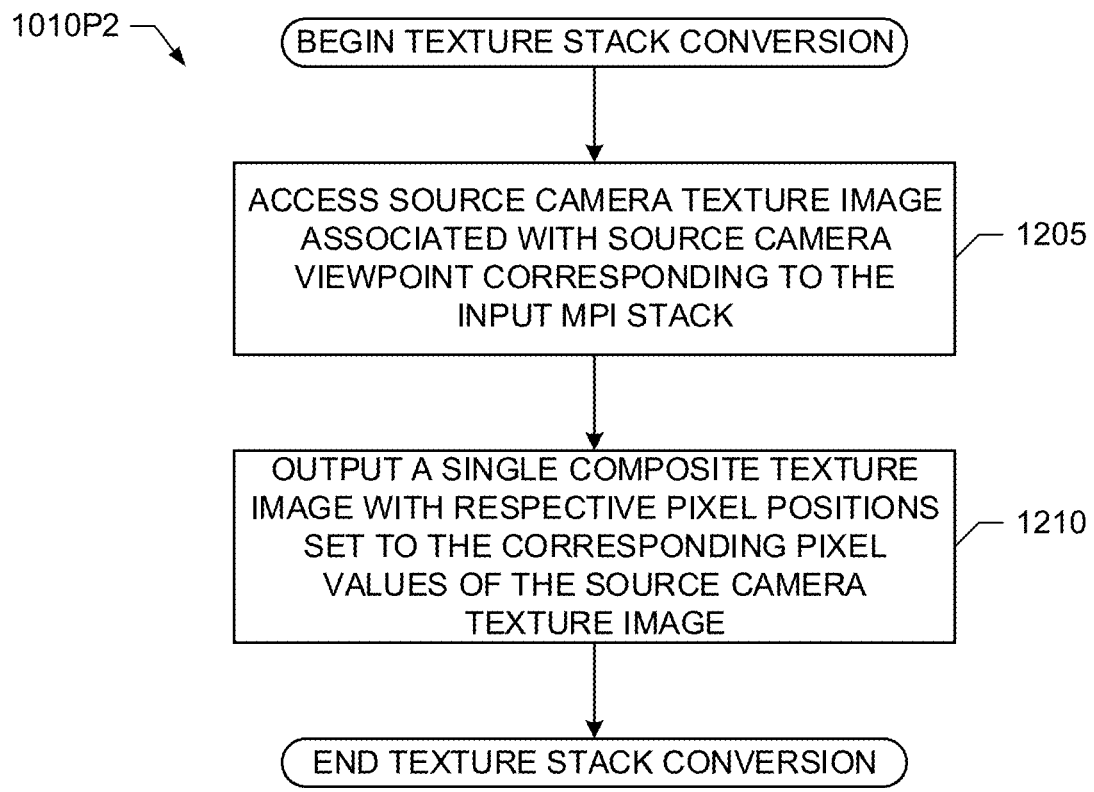

An example program 1000 that may be executed to implement the MPI stack encoder 410 of FIGS. 4 and/or 5 is represented by the flowchart shown in FIG. 10. With reference to the preceding figures and associated written descriptions, the example program 1000 of FIG. 10 begins execution at block 1005 at which the MPI stack encoder 410 determines whether the input texture image stack 140 included in the generated MPI stack 135 corresponding to a source camera viewpoint is to be compressed. If the input texture image stack 140 is to be compressed (block 1005), at block 1010 the MPI compressed image encoder 425 of the MPI stack encoder 410 converts the input texture image stack 140 to the single composite texture image 430, as described above. Example programs to implement the processing at block 1010 are illustrated in FIGS. 11 and 12, which are described in further detail below. At block 1015, the MPI compressed image encoder 425 outputs the single composite texture image 430. Control then proceeds to block 1020. However, if the input texture image stack 140 is not to be compressed (block 1005), at block 1025 the MPI stack encoder 410 outputs the texture image stack 140. Control then proceeds to block 1020.

Figure 13:
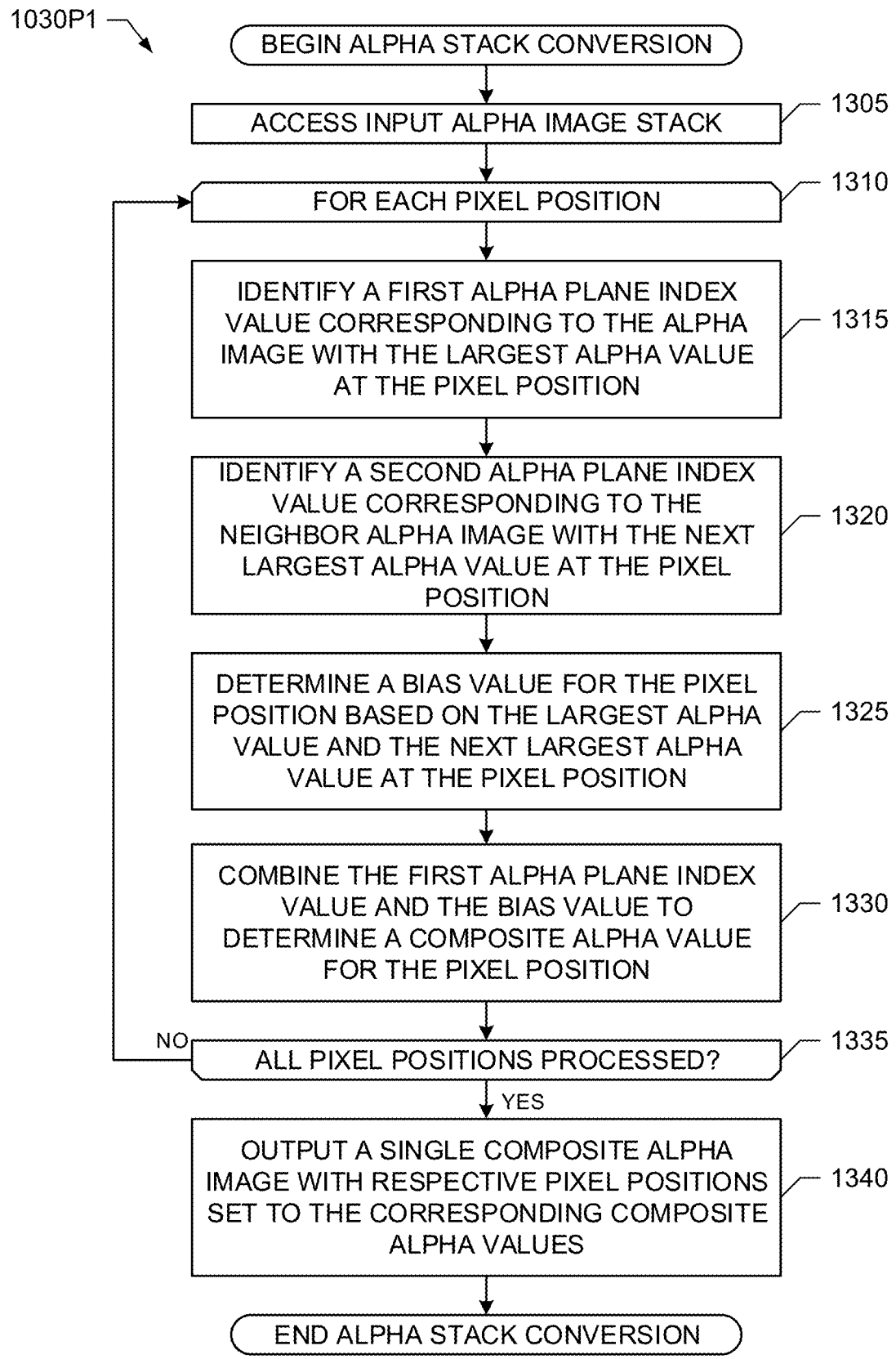
Figure 14:
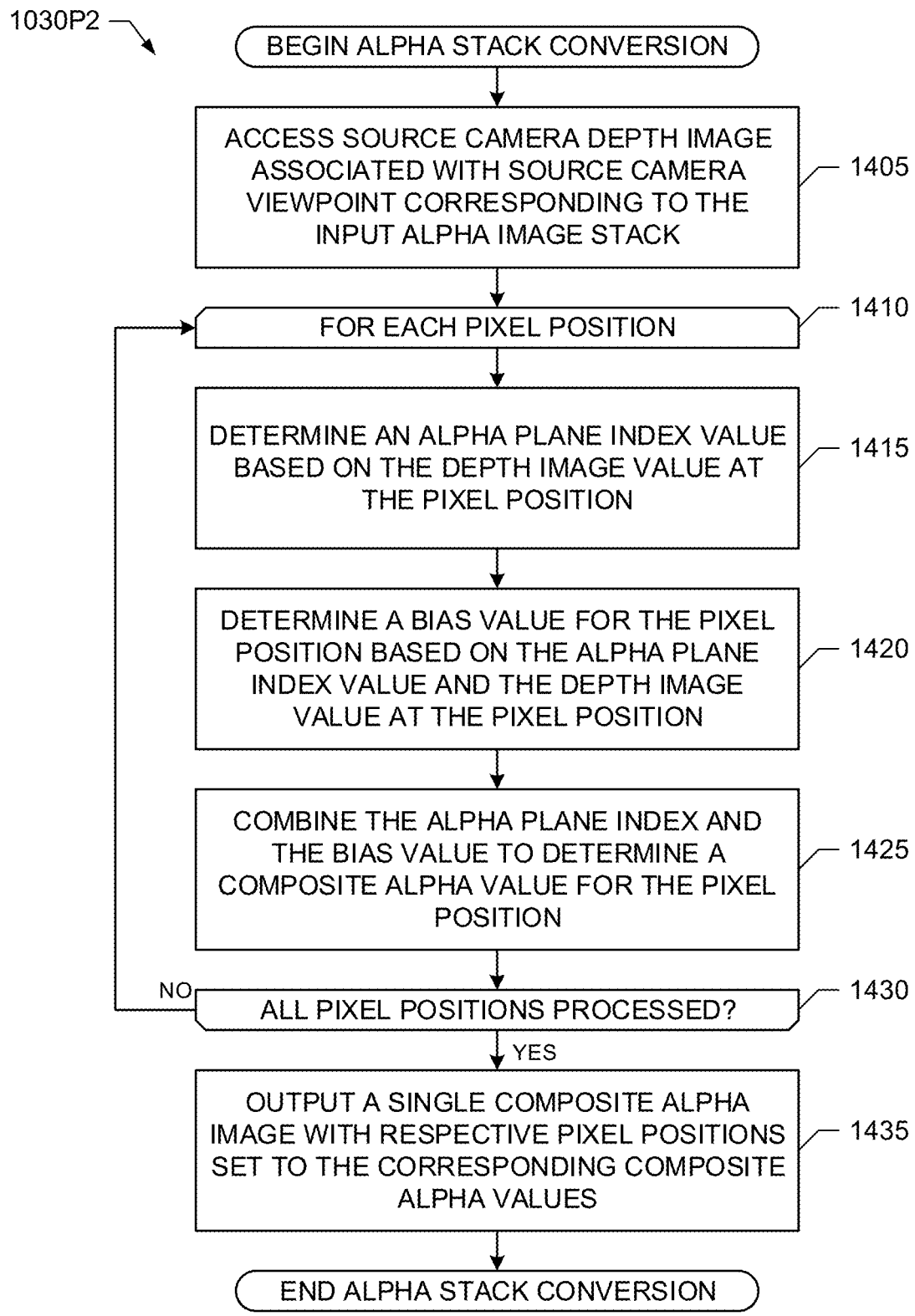

At block 1020, the MPI stack encoder 410 determines whether the input alpha image stack 150 included in the generated MPI stack 135 corresponding to the source camera viewpoint is to be compressed. If the input alpha image stack 150 is to be compressed (block 1020), at block 1030 the MPI compressed image encoder 425 of the MPI stack encoder 410 converts the input alpha image stack 150 to the single composite alpha image 435, as described above. Example programs to implement the processing at block 1030 are illustrated in FIGS. 13 and 14, which are described in further detail below. At block 1035, the MPI compressed image encoder 425 outputs the single composite alpha image 435. Control then proceeds to block 1040. However, if the input alpha image stack 150 is not to be compressed (block 1020), at block 1045 the MPI stack encoder 410 outputs the alpha image stack 150. Control then proceeds to block 1040.

At block 1040, the MPI stack encoder 410 determines whether other MPI stacks 135 corresponding to other source camera viewpoints are to be processed. If other MPI stacks 135 are to be processed, control returns to block 1005. Otherwise, execution of the example program 1000 ends.

An example program 1010P1 that may be executed to implement the texture stack compressor 510 of the MPI compressed image encoder 425 and/or the processing at block 1010 of FIG. 10 is illustrated in FIG. 11. With reference to the preceding figures and associated written descriptions, the example program 1010P1 of FIG. 11 begins execution at block 1105 at which the texture stack compressor 510 accesses the input texture image stack 140 from the data interface 505. At block 1110, the texture stack compressor 510 accesses the input alpha image stack 150 from the data interface 505. At block 1115, the texture stack compressor 510 begins processing each texture image of the texture image stack 140. For example, at block 1120 texture stack compressor 510 weights the pixel values of a given texture image by the pixel values of the alpha image corresponding to that texture image, as described above. For example, the processing at block 1120 can correspond to the texture stack compressor 510 computing the numerator term $t_{i,j} \alpha_{i,j}$ of Equation 1 described above. At block 1125, the texture stack compressor 510 continues processing the texture images until all the texture images of the texture image stack 140 have been processed.

At block 1130, the texture stack compressor 510 begins iterating through each pixel position i to determine the pixel values for the single composite texture image 430. For example, at block 1135, the texture stack compressor 510 uses the weighted texture images determined at block 1120 to determine an alpha-weighted average pixel value for the pixel position i of the single composite texture image 430, as described above. For example, the processing at block 1120 can correspond to the texture stack compressor 510 computing the output term $p_{i,j}$ of Equation 1 described above. At block 1140, the texture stack compressor 510 continues processing the pixel positions until all the pixel positions of the single composite texture image 430 have been evaluated. At block 1145, the texture stack compressor 510 outputs, via the data interface 505, the single composite texture image 430 with respective pixel positions i set to the corresponding alpha-weighted average pixel values $p_{i,j}$ determined at block 1135. Execution of the example program 1010P1 then ends.

An example program 1010P2 that may be executed to implement the texture stack compressor 510 of the MPI compressed image encoder 425 and/or the processing at block 1010 of FIG. 10 is illustrated in FIG. 12. With reference to the preceding figures and associated written descriptions, the example program 1010P2 of FIG. 12 begins execution at block 1205 at which the texture stack compressor 510 accesses, via the data interface 505, a source camera texture image associated with the source camera viewpoint corresponding to the input texture image stack 140. At block 1210, the texture stack compressor 510 outputs, via the data interface 505, the single composite texture image 430 with respective pixel positions i set to the corresponding pixel values of the source camera texture image. Execution of the example program 1010P2 then ends.

An example program 1030P1 that may be executed to implement the alpha stack compressor 515 of the MPI compressed image encoder 425 and/or the processing at block 1030 of FIG. 10 is illustrated in FIG. 13. With reference to the preceding figures and associated written descriptions, the example program 1030P1 of FIG. 13 begins execution at block 1305 at which the alpha stack compressor 515 accesses the input alpha image stack 150 from the data interface 505. At block 1310, the alpha stack compressor 515 begins processing each pixel position i to determine the pixel values for the single composite alpha image 435. For example, at block 1315, the alpha stack compressor 515 identifies, as described above, a first alpha plane index value (e.g., $p_{i,m}$) identifying the alpha plane of the input alpha image stack 150 with the largest value of alpha (e.g., $a_{i,m}$) at the given pixel position i. At block 1320, the alpha stack compressor 515 identifies, as described above, a second alpha plane index value (e.g., $p_{i,m}+1$ or $p_{i,m}-1$) identifying the neighboring alpha plane with the next largest alpha value (e.g., $a_{i,2}$) at the given pixel position i. At block 1325, the alpha stack compressor 515 determines, as described above, a bias value (e.g., $b_i$) for the given pixel position i based on the largest alpha value (e.g., $a_{i,m}$) and the next largest alpha value (e.g., $a_{i,2}$). For example, at block 1325, the alpha stack compressor 515 may determine the bias value $b_i$ according to Equation 2, as described above. At block 1330, the alpha stack compressor 515 combines, as described above, the first alpha plane index value (e.g., $p_{i,m}$) and the bias value (e.g., $b_i$) to determine a composite alpha value (e.g., $d_i$) for the given pixel position i. For example, at block 1330, the alpha stack compressor 515 may determine the composite alpha value $d_i$ for the given pixel position i according to Equation 3, as described above. At block 1335, the alpha stack compressor 515 continues processing the pixel positions until all the pixel positions of the single composite alpha image 435 have been evaluated. At block 1340, the alpha stack compressor 515 outputs, via the data interface 505, the single composite alpha image 435 with respective pixel positions i set to the corresponding composite alpha values $d_i$ determined at block 1330. Execution of the example program 1030P1 then ends.

An example program 1030P2 that may be executed to implement the alpha stack compressor 515 of the MPI compressed image encoder 425 and/or the processing at block 1030 of FIG. 10 is illustrated in FIG. 14. With reference to the preceding figures and associated written descriptions, the example program 1030P2 of FIG. 14 begins execution at block 1405 at which the alpha stack compressor 515 accesses, via the data interface 505, a source camera depth image associated with a source camera viewpoint corresponding to the input alpha image stack 150. At block 1410, the alpha stack compressor 515 begins processing each pixel position i to determine the pixel values for the single composite alpha image 435. For example, at block 1415, the alpha stack compressor 515 determines, as described above, an alpha plane index value (e.g., j) based on the depth image value (e.g., d) at the given pixel position i. For example, at block 1415, the alpha stack compressor 515 may determine the alpha plane index value j at the given pixel position i according to Equation 12, as described above. At block 1420, the alpha stack compressor 515 determines, as described above, a bias value (e.g., $d_j$) for the given pixel position i based on the alpha plane index value (e.g., j) and the depth image value (e.g., d) at the given pixel position i. For example, at block 1420, the alpha stack compressor 515 may determine the bias value $d_j$ according to the expression $d_j = d - j*I$, as described above. At block 1425, the alpha stack compressor 515 combines, as described above, the alpha plane index value (e.g., j) and the bias value (e.g., $d_j$) to determine a composite alpha value (e.g., $d_i$) for the given pixel position i. For example, at block 1425, the alpha stack compressor 515 may determine the composite alpha value $d_i$ for the given pixel position i according to Equation 13, as described above. At block 1430, the alpha stack compressor 515 continues processing the pixel positions until all the pixel positions of the single composite alpha image 435 have been evaluated. At block 1435, the alpha stack compressor 515 outputs, via the data interface 505, the single composite alpha image 435 with respective pixel positions i set to the corresponding composite alpha values $d_i$ determined at block 1425. Execution of the example program 1030P1 then ends.

An example program 1500 that may be executed to implement the MPI stack decoder 420 of FIGS. 4 and/or 6 is represented by the flowchart shown in FIG. 15. With reference to the preceding figures and associated written descriptions, the example program 1500 of FIG. 15 begins execution at block 1505 at which the MPI stack decoder 420 determines whether a composite texture image 450 corresponding to a source camera viewpoint is to be decompressed. If there is a composite texture image 450 to be decompressed (block 1505), at block 1510 the MPI compressed image decoder 460 of the MPI stack decoder 420 decompresses the composite texture image 450 to obtain an uncompressed texture image stack 465, as described above. An example program to implement the processing at block 1510 is illustrated in FIG. 16, which is described in further detail below. At block 1015, the MPI compressed image decoder 460 outputs the uncompressed texture image stack 465. Control then proceeds to block 1520. However, if there is not a composite texture image 450 to be decompressed (block 1505), at block 1525 the MPI stack decoder 420 outputs the received texture image stack (as there was no texture stack compression at the source platform 405). Control then proceeds to block 1520.

At block 1520, the MPI stack decoder 420 determines whether a composite alpha image 455 corresponding to the source camera viewpoint is to be decompressed. If there is a composite alpha image 455 to be decompressed (block 1520), at block 1530 the MPI compressed image decoder 460 of the MPI stack decoder 420 decompresses the composite alpha image 455 to obtain an uncompressed alpha image stack 470, as described above. An example program to implement the processing at block 1530 is illustrated in FIG. 17, which is described in further detail below. At block 1535, the MPI compressed image decoder 460 outputs the uncompressed alpha image stack 470. Control then proceeds to block 1540. However, if there is not a composite alpha image 455 to be decompressed (block 1520), at block 1545 the MPI stack decoder 420 outputs the received alpha image stack (as there was no alpha stack compression at the source platform 405). Control then proceeds to block 1520.

At block 1540, the MPI stack decoder 420 determines whether MPI decompression for other source camera viewpoints is to be performed. If other source camera viewpoints are to undergo MPI decompression, control returns to block 1505. Otherwise, execution of the example program 1500 ends.

An example program 1510P that may be executed to implement the texture stack decompressor 610 of the MPI compressed image decoder 460 and/or the processing at block 1510 of FIG. 15 is illustrated in FIG. 16. With reference to the preceding figures and associated written descriptions, the example program 1510P of FIG. 16 begins execution at block 1605 at which the texture stack decompressor 610 accesses the composite texture image 450 via the data interface 605. At block 1610, the texture stack decompressor 610 replicates, as described above, the composite texture image 450 to form the uncompressed texture image stack 465. At block 1615, the texture stack decompressor 610 outputs the uncompressed texture image stack 465 via the data interface 605. Execution of the example program 1510P then ends.

An example program 1530P that may be executed to implement the alpha stack decompressor 615 of the MPI compressed image decoder 460 and/or the processing at block 1530 of FIG. 15 is illustrated in FIG. 17. With reference to the preceding figures and associated written descriptions, the example program 1530P of FIG. 17 begins execution at block 1705 at which the alpha stack decompressor 615 accesses the composite alpha image 455 via the data interface 605. At block 1710, the alpha stack decompressor 615 begins processing each pixel position i of the composite alpha image 455 to determine the uncompressed alpha image stack 470. For example, at block 1715, the alpha stack decompressor 615 determines, as described above, a first alpha plane index value (e.g., $\hat{p}_{i,m}$) for the given pixel position i based on the composite alpha value (e.g., $d_i$) at pixel position i. For example, at block 1715, the alpha stack decompressor 615 may determine the first alpha plane index value $\hat{p}_{i,m}$ according to Equation 5, as described above. At block 1720, the alpha stack decompressor 615 determines, as described above, a bias value ($\hat{b}_i$) for the given pixel position i based on the first alpha plane index value (e.g., $\hat{p}_{i,m}$) and the composite alpha value (e.g., $d_i$) at pixel position i. For example, at block 1720, the alpha stack decompressor 615 may determine the bias value $\hat{b}_i$ according to Equation 6, as described above. At block 1725, the alpha stack decompressor 615 determines, as described above, a second alpha plane index value (e.g., $\hat{p}_{i,m}+1$ or $\hat{p}_{i,m}-1$) for the given pixel position i based on bias value ($\hat{b}_i$) for the pixel position i. For example, at block 1725, the alpha stack decompressor 615 may set the second alpha plane index value to be $\hat{p}_{i,m}+1$ if the bias value $\hat{b}_i$ is positive and may set the second alpha plane index value to be $\hat{p}_{i,m}-1$ if the bias value $\hat{b}_i$ is negative, as described above.

At block 1730, the alpha stack decompressor 615 determines, as described above, a second alpha value (e.g., $\hat{a}_{i,2}$) for the given pixel position i based on the bias value ($\hat{b}_i$) for the pixel position i. For example, at block 1730, the alpha stack decompressor 615 may determine the second alpha value $\hat{a}_{i,2}$ according to Equation 7, as described above. At block 1735, the alpha stack decompressor 615 determines a first alpha value ($\hat{a}_{i,m}$) for the given pixel position i based on the second alpha value (e.g., $\hat{a}_{i,2}$) determined for the pixel position i. For example, at block 1735, the alpha stack decompressor 615 may determine the first alpha value $\hat{a}_{i,m}$ according to Equation 8, as described above. At block 1740, the alpha stack decompressor 615 sets the given pixel position i in the uncompressed alpha image identified by the first alpha plane index value (e.g., $\hat{p}_{i,m}$) to have the first alpha value ($\hat{a}_{i,m}$), as described above. At block 1745, the alpha stack decompressor 615 sets the given pixel position i in the uncompressed alpha image identified by the second alpha plane index value (.g., +1 or -1) to have the second alpha value (e.g., $\hat{a}_{i,2}$), as described above. At block 1750, the alpha stack decompressor 615 sets the remaining uncompressed alpha images of the uncompressed alpha image stack 470 to zero at the given pixel position i, as described above. At block 1755, the alpha stack decompressor 615 continues processing the pixel positions until all the pixel positions of the composite alpha image 455 have been evaluated. At block 1760, the alpha stack decompressor 615 outputs, via the data interface 605, the uncompressed alpha image stack 470. Execution of the example program 1530P then ends.

Figure 18:
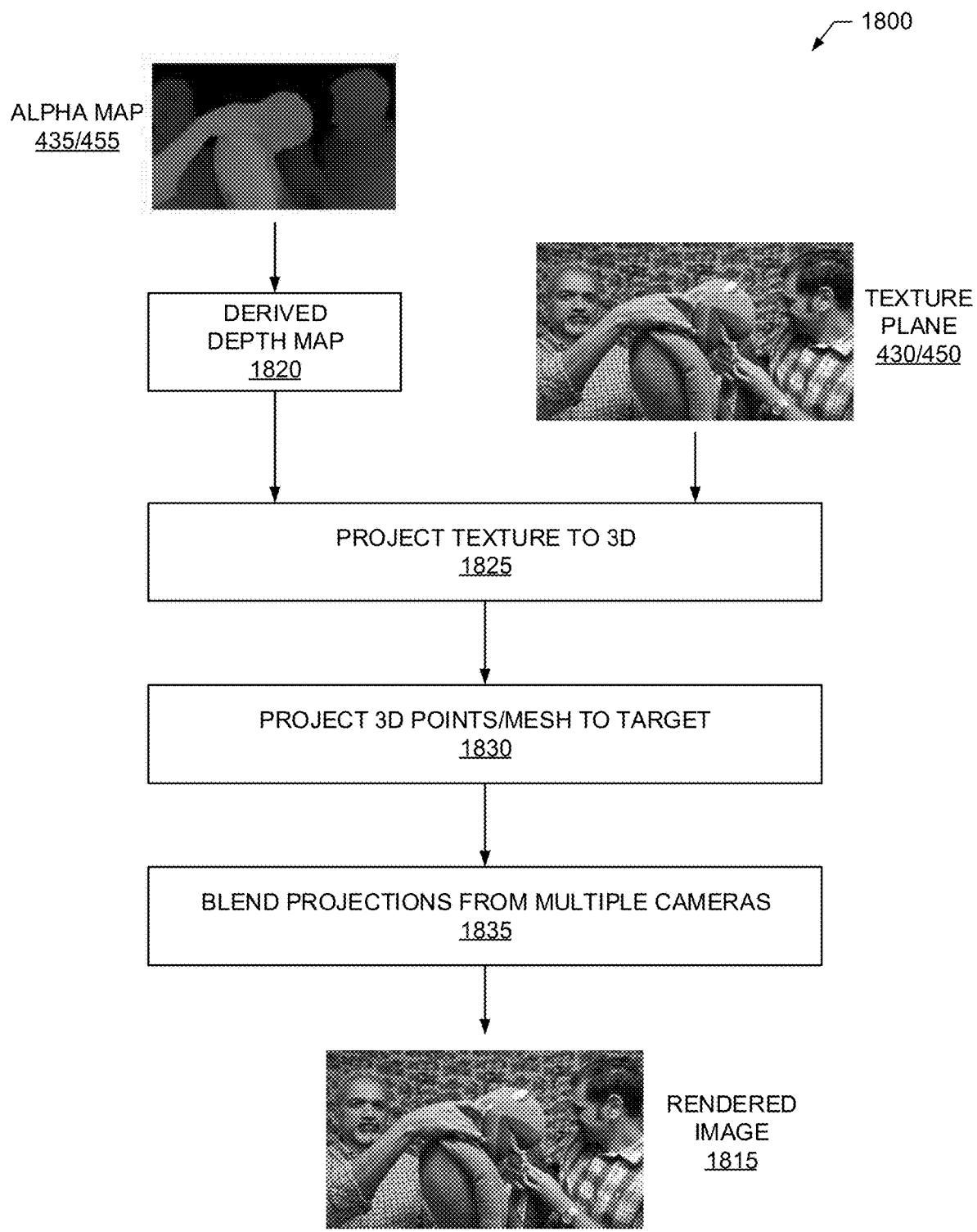
FIG. 18 illustrates an example to be procedure performed by the example video encoding and decoding system of FIG. 4 to render a target image using a single composite alpha image and a single composite texture image.

FIG. 18 illustrates an example procedure 1800 to be performed by the example video encoding and decoding system 400 of FIG. 4 to render a target image using the single composite alpha image 435/455 and the single composite texture image 430/450 determined, as described above, by the MPI compressed image encoder 425 of the MPI stack encoder 410. In the illustrated example procedure 1800, the MPI stack decoder 420 the single composite alpha image 435/455 (also referred to as the alpha map or compressed alpha map) as an example coarse depth map from which an example derived depth map 1820 is created. The derived depth map 1820 is to be used to directly project the single composite texture image 430/450 to a rendered target image 1815 of a target viewpoint.

In the illustrated example, the derived depth map 1820 is determined as follows. First, the composite alpha image 435/455 (e.g., alpha map or compressed alpha map) is treated as a coarse 8-bit depth map. To obtain a 10-bit or 16-bit depth map, the MPI stack decoder 420 multiples the values are of the composite alpha image 435/455 (e.g., alpha map or compressed alpha map) by 4 or 256 respectively. From the 8-bit depth map with pixel values d, the MPI stack decoder 420 determines the raw depth z according to Equation 18, which is:

$$\frac{1}{z} = \frac{d}{255}\left(\frac{1}{d_{min}} - \frac{1}{d_{max}}\right) + \frac{1}{d_{max}} \qquad \text{Equation 18}$$

In the example procedure 1800, the raw depth is used to project each pixel into 3D space using the camera intrinsic properties (focal length, principal point) and extrinsic properties (location of camera center relative to world coordinates). For example, at block 1825, the pixel may be projected directly into the target view's image (which may involve less computation), and/or at block 1830 the raw depth can be used to create a 3D triangular mesh that is projected to the target and rasterized (which may involve greater computation).

At block 1835, images obtained by projecting multiple cameras are then blended to produce the final rendered target image 1815. The blending uses a weighing function that depends on the distance of the target camera center from the source.

Figure 19:
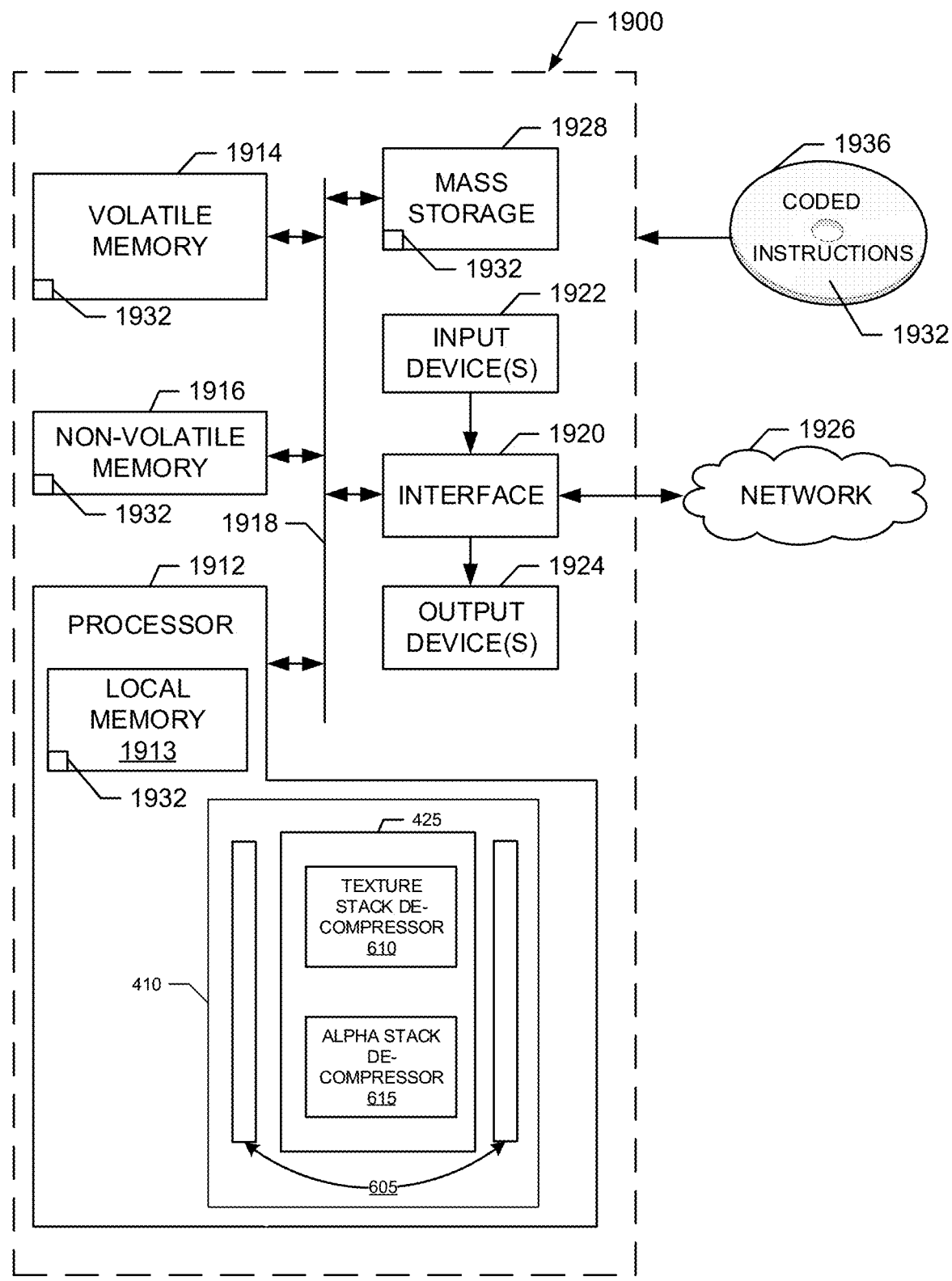
FIG. 19 is a block diagram of an example processor platform structured to execute the example machine readable instructions of FIGS. 10-14 to implement the MPI stack encoder of FIGS. 4 and/or 5.

FIG. 19 is a block diagram of an example processor platform 1900 structured to execute the instructions of FIGS. 10-14 to implement the MPI stack encoder 410 of FIGS. 4 and/or 5. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a digital camera, a headset or other wearable device, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor 1912 may be a semiconductor based (e.g., silicon based) device. In this example, the processor 1912 implements the MPI compressed image encoder 425, the data interface 505, the texture stack compressor 510 and the alpha stack compressor 515.

The processor 1912 of the illustrated example includes a local memory 1913 (e.g., a cache). The processor 1912 of the illustrated example is in communication with a main memory including a volatile memory 1914 and a non-volatile memory 1916 via a link 1918. The link 1918 may be implemented by a bus, one or more point-to-point connections, etc., or a combination thereof. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1900, can allow the user to control the computer system and provide data to the computer using physical gestures, such as, but not limited to, hand or body movements, facial expressions, and face recognition.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

Machine executable instructions 1932 corresponding to the instructions of FIGS. 10-14 may be stored in the mass storage device 1928, in the volatile memory 1914, in the non-volatile memory 1916, in the local memory 1913 and/or on a removable non-transitory computer readable storage medium, such as a CD or DVD 1936.

Figure 20:
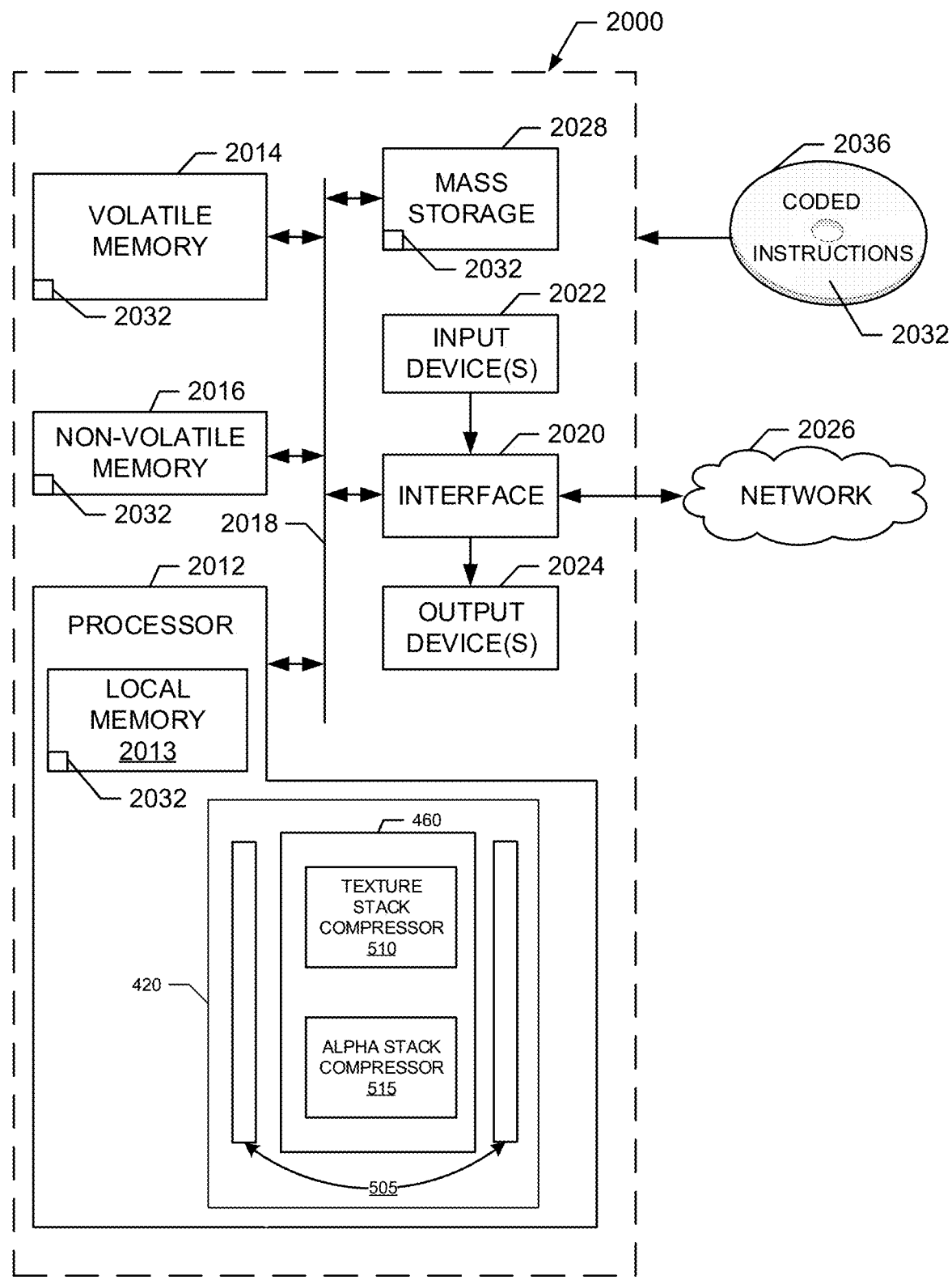
FIG. 20 is a block diagram of an example processor platform structured to execute the example machine readable instructions of FIGS. 15-17 to implement the MPI stack decoder of FIGS. 4 and/or 6.

FIG. 20 is a block diagram of an example processor platform 2000 structured to execute the instructions of FIGS. 15-17 to implement the MPI stack decoder 420 of FIGS. 4 and/or 6. The processor platform 2000 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a digital camera, a headset or other wearable device, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, GPUs, DSPs, or controllers from any desired family or manufacturer. The hardware processor 2012 may be a semiconductor based (e.g., silicon based) device. In this example, the processor 2012 implements the MPI compressed image decoder 460, the data interface 605, the texture stack decompressor 610 and the alpha stack decompressor 615.

The processor 2012 of the illustrated example includes a local memory 2013 (e.g., a cache). The processor 2012 of the illustrated example is in communication with a main memory including a volatile memory 2014 and a non-volatile memory 2016 via a link 2018. The link 2018 may be implemented by a bus, one or more point-to-point connections, etc., or a combination thereof. The volatile memory 2014 may be implemented by SDRAM, DRAM, RDRAM® and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a USB, a Bluetooth® interface, an NFC interface, and/or a PCI express interface.

In the illustrated example, one or more input devices 2022 are connected to the interface circuit 2020. The input device(s) 2022 permit(s) a user to enter data and/or commands into the processor 2012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2000, can allow the user to control the computer system and provide data to the computer using physical gestures, such as, but not limited to, hand or body movements, facial expressions, and face recognition.

One or more output devices 2024 are also connected to the interface circuit 2020 of the illustrated example. The output devices 2024 can be implemented, for example, by display devices (e.g., an LED, an OLED, an LCD, a CRT display, an IP display, a touchscreen, etc.), a tactile output device, a printer and/or speakers(s). The interface circuit 2020 of the illustrated example, thus, typically includes a graphics driver card, a graphics driver chip and/or a graphics driver processor.

The interface circuit 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2026. The communication can be via, for example, an Ethernet connection, a DSL connection, a telephone line connection, a coaxial cable system, a satellite system, a line-of-site wireless system, a cellular telephone system, etc.

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and DVD drives.

Machine executable instructions 2032 corresponding to the instructions of FIGS. 10-14 may be stored in the mass storage device 2028, in the volatile memory 2014, in the non-volatile memory 2016, in the local memory 2013 and/or on a removable non-transitory computer readable storage medium, such as a CD or DVD 2036.

Figure 21:
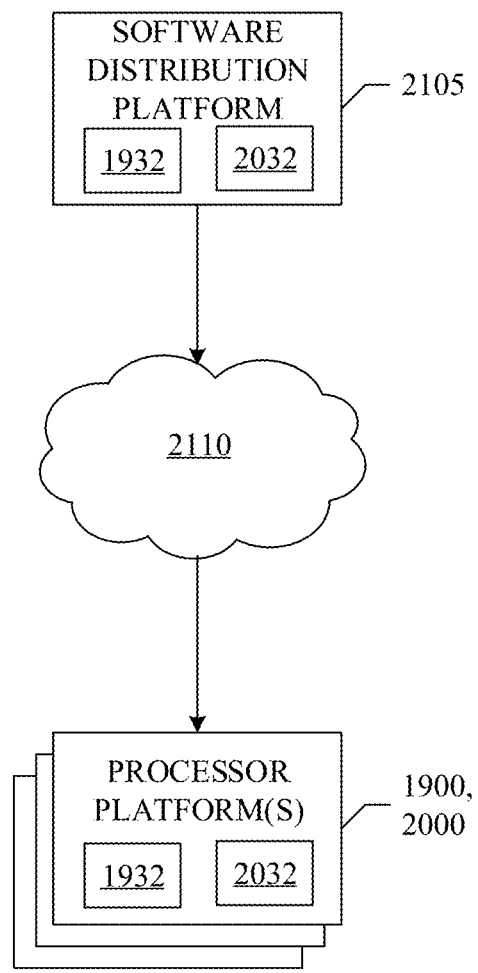
FIG. 21 is a block diagram of an example software distribution platform to distribute software (e.g., software corresponding to the example computer readable instructions of FIGS. 10-17) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 2105 to distribute software such as the example computer readable instructions 1932 and/or 2032 of FIGS. 19 and/or 20 to third parties is illustrated in FIG. 21. The example software distribution platform 2105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1932 and/or 2032 of FIGS. 19 and/or 20. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the computer readable instructions 1932 and/or 2032, which may correspond to the example computer readable instructions of FIGS. 10-14 and 15-17 as described above. The one or more servers of the example software distribution platform 2105 are in communication with a network 2110, which may correspond to any one or more of the Internet and/or any of the example networks 1926 and/or 2026 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1932 and/or 2032 from the software distribution platform 2105. For example, the software, which may correspond to the example computer readable instructions of FIGS. 10-14, may be downloaded to the example processor platform 1900 which is to execute the computer readable instructions 1932 to implement the MPI stack encoder 410. Additionally or alternatively, the software, which may correspond to the example computer readable instructions of FIGS. 15-17, may be downloaded to the example processor platform 2000 which is to execute the computer readable instructions 2032 to implement the MPI stack decoder 420. In some example, one or more servers of the software distribution platform 2105 periodically offer, transmit, and/or force updates to the software (e.g., the example computer readable instructions 1932 and/or 2032 of FIGS. 19 and/or 20) to ensure improvements, patches, updates, etc. are distributed and applied to the software at the end user devices.

From the foregoing, it will be appreciated that example methods, apparatus and articles of manufacture have been disclosed that implement multi-plane image compression. The disclosed methods, apparatus and articles of manufacture improve the efficiency of using a computing device by reducing the quantity of MPI data to be transferred to a target platform for image rendering, while maintaining the quality of the rendered image. As such, example MPI compression techniques disclosed herein allow for a lower-bandwidth transmission to the target or rendering node relative to the transmission bandwidth required for other (e.g., conventional) techniques. Thus, example MPI compression techniques disclosed can enable execution of virtual reality and immersive media applications one resource-constrained platforms, but can also be used in any number of image processing systems and applications. The disclosed methods, apparatus and articles of manufacture are accordingly directed to one or more improvement(s) in the functioning of a computer.

The foregoing disclosure provides example solutions to implement multi-plane image compression. The following further examples, which include subject matter such as apparatus to implement multi-plane image compression, at least one non-transitory computer readable medium including instructions that, when executed, cause at least one processor to implement multi-plane image compression, and associated methods, are disclosed herein. The disclosed examples can be implemented individually and/or in one or more combinations.

Example 1 includes an apparatus to compress multiplane image stacks, the apparatus including an interface to access an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images, and a compressed image encoder to at least one of (i) convert the plurality of texture images to a single composite texture image to generate a compressed multiplane image stack, or (ii) convert the plurality of alpha images to a single composite alpha image to generate the compressed multiplane image stack, the interface to output the compressed multiplane image stack.

Example 2 includes the apparatus of example 1, wherein the compressed image encoder is to combine the plurality of texture images based on the plurality of alpha images to convert the plurality of texture images to the single composite texture image.

Example 3 includes the apparatus of example 2, wherein to combine the plurality of texture images based on the plurality of alpha images, the compressed image encoder is to weight pixel values of ones of the texture images by pixel values of respective ones of the alpha images corresponding to the ones of the texture images to determine a plurality of alpha weighted texture images.

Example 4 includes the apparatus of example 3, wherein to combine the plurality of texture images based on the plurality of alpha images, the compressed image encoder is to average the alpha weighted texture images to determine the single composite texture image, the single composite texture image including alpha weighted pixel values at respective pixel positions of the single composite texture image.

Example 5 includes the apparatus of example 1, wherein the compressed image encoder is to replace the plurality of texture images with a source camera image associated with the source camera viewpoint corresponding to the input multiplane image stack to convert the plurality of texture images to the single composite texture image.

Example 6 includes the apparatus of example 1, wherein to convert the plurality of alpha images to the single composite alpha image, the compressed image encoder is to identify a first alpha plane index value corresponding to a first one of the alpha images with a largest alpha value among the alpha images at a first pixel position, identify a first alpha plane index value corresponding to neighbor alpha image of the first one of the alpha images with a next largest alpha value among the alpha images at the first pixel position, determine a bias value for the first pixel position, the bias value based on the largest alpha value and the next largest alpha value at the first pixel position, and combine the first alpha plane index value and the bias value to determine a composite alpha value to include in the single composite alpha image at the first pixel position.

Example 7 includes the apparatus of example 1, wherein to convert the plurality of alpha images to the single composite alpha image, the compressed image encoder is to identify an alpha plane index value corresponding to value of a source camera depth image at a first pixel position, the source camera depth image associated with the source camera viewpoint corresponding to the input multiplane image stack, determine a bias value for the first pixel position, the bias value based on the alpha plane index value for the first pixel position and the source camera depth image at the first pixel position, and combine the alpha plane index value and the bias value to determine a composite alpha value to include in the single composite alpha image at the first pixel position.

Example 8 includes the apparatus of example 1, wherein the compressed image encoder is to (i) convert the plurality of texture images to the single composite texture image to generate the compressed multiplane image stack and (ii) convert the plurality of alpha images to the single composite alpha image to generate the compressed multiplane image stack.

Example 9 includes at least one non-transitory computer readable medium comprising computer readable instructions that, when executed, cause at least one processor to at least access an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images, at least one of (i) convert the plurality of texture images to a single composite texture image to generate a compressed multiplane image stack, or (ii) convert the plurality of alpha images to a single composite alpha image to generate the compressed multiplane image stack, and output the compressed multiplane image stack.

Example 10 includes the at least one non-transitory computer readable medium of example 9, wherein the instructions cause the at least one processor to combine the plurality of texture images based on the plurality of alpha images to convert the plurality of texture images to the single composite texture image.

Example 11 includes the at least one non-transitory computer readable medium of example 10, wherein to combine the plurality of texture images based on the plurality of alpha images, the instructions cause the at least one processor to weight pixel values of ones of the texture images by pixel values of respective ones of the alpha images corresponding to the ones of the texture images to determine a plurality of alpha weighted texture images.

Example 12 includes the at least one non-transitory computer readable medium of example 11, wherein to combine the plurality of texture images based on the plurality of alpha images, the instructions cause the at least one processor to average the alpha weighted texture images to determine the single composite texture image, the single composite texture image including alpha weighted pixel values at respective pixel positions of the single composite texture image.

Example 13 includes the at least one non-transitory computer readable medium of example 9, wherein the instructions cause the at least one processor to replace the plurality of texture images with a source camera image associated with the source camera viewpoint corresponding to the input multiplane image stack to convert the plurality of texture images to the single composite texture image.

Example 14 includes the at least one non-transitory computer readable medium of example 9, wherein to convert the plurality of alpha images to the single composite alpha image, the instructions cause the at least one processor to identify a first alpha plane index value corresponding to a first one of the alpha images with a largest alpha value among the alpha images at a first pixel position, identify a first alpha plane index value corresponding to neighbor alpha image of the first one of the alpha images with a next largest alpha value among the alpha images at the first pixel position, determine a bias value for the first pixel position, the bias value based on the largest alpha value and the next largest alpha value at the first pixel position, and combine the first alpha plane index value and the bias value to determine a composite alpha value to include in the single composite alpha image at the first pixel position.

Example 15 includes the at least one non-transitory computer readable medium of example 9, wherein to convert the plurality of alpha images to the single composite alpha image, the instructions cause the at least one processor to identify an alpha plane index value corresponding to value of a source camera depth image at a first pixel position, the source camera depth image associated with the source camera viewpoint corresponding to the input multiplane image stack, determine a bias value for the first pixel position, the bias value based on the alpha plane index value for the first pixel position and the source camera depth image at the first pixel position, and combine the alpha plane index value and the bias value to determine a composite alpha value to include in the single composite alpha image at the first pixel position.

Example 16 includes the at least one non-transitory computer readable medium of example 9, wherein the instructions cause the at least one processor to (i) convert the plurality of texture images to the single composite texture image to generate the compressed multiplane image stack and (ii) convert the plurality of alpha images to the single composite alpha image to generate the compressed multiplane image stack.

Example 17 includes a method to compress multiplane image stacks, the method comprising accessing an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images, at least one of (i) converting the plurality of texture images to a single composite texture image to generate a compressed multiplane image stack, or (ii) converting the plurality of alpha images to a single composite alpha image to generate the compressed multiplane image stack, and outputting the compressed multiplane image stack.

Example 18 includes the method of example 17, wherein the converting of the plurality of texture images includes combining the plurality of texture images based on the plurality of alpha images to convert the plurality of texture images to the single composite texture image.

Example 19 includes the method of example 18, wherein the combining of the plurality of texture images includes weighting pixel values of ones of the texture images by pixel values of respective ones of the alpha images corresponding to the ones of the texture images to determine a plurality of alpha weighted texture images.

Example 20 includes the method of example 19, wherein the combining of the plurality of texture images includes averaging the alpha weighted texture images to determine the single composite texture image, the single composite texture image including alpha weighted pixel values at respective pixel positions of the single composite texture image.

Example 21 includes the method of example 17, wherein the converting of the plurality of texture images includes replacing the plurality of texture images with a source camera image associated with the source camera viewpoint corresponding to the input multiplane image stack to convert the plurality of texture images to the single composite texture image.

Example 22 includes the method of example 17, wherein the converting of the plurality of alpha images includes identifying a first alpha plane index value corresponding to a first one of the alpha images with a largest alpha value among the alpha images at a first pixel position, identifying a first alpha plane index value corresponding to neighbor alpha image of the first one of the alpha images with a next largest alpha value among the alpha images at the first pixel position, determining a bias value for the first pixel position, the bias value based on the largest alpha value and the next largest alpha value at the first pixel position, and combining the first alpha plane index value and the bias value to determine a composite alpha value to include in the single composite alpha image at the first pixel position.

Example 23 includes the method of example 17, wherein the converting of the plurality of alpha images includes identifying an alpha plane index value corresponding to value of a source camera depth image at a first pixel position, the source camera depth image associated with the source camera viewpoint corresponding to the input multiplane image stack, determining a bias value for the first pixel position, the bias value based on the alpha plane index value for the first pixel position and the source camera depth image at the first pixel position, and combining the alpha plane index value and the bias value to determine a composite alpha value to include in the single composite alpha image at the first pixel position.

Example 24 includes the method of example 17, wherein the method includes (i) converting the plurality of texture images to the single composite texture image to generate the compressed multiplane image stack and (ii) converting the plurality of alpha images to the single composite alpha image to generate the compressed multiplane image stack.

Example 25 includes an apparatus to compress multiplane image stacks, the apparatus comprising at least one memory, computer readable instructions, and at least one processor to execute the computer readable instructions to at least access an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images, at least one of (i) convert the plurality of texture images to a single composite texture image to generate a compressed multiplane image stack, or (ii) convert the plurality of alpha images to a single composite alpha image to generate the compressed multiplane image stack, and output the compressed multiplane image stack.

Example 26 includes the apparatus of example 25, wherein the at least one processor is to combine the plurality of texture images based on the plurality of alpha images to convert the plurality of texture images to the single composite texture image.

Example 27 includes the apparatus of example 26, wherein to combine the plurality of texture images based on the plurality of alpha images, the at least one processor is to weight pixel values of ones of the texture images by pixel values of respective ones of the alpha images corresponding to the ones of the texture images to determine a plurality of alpha weighted texture images.

Example 28 includes the apparatus of example 27, wherein to combine the plurality of texture images based on the plurality of alpha images, the at least one processor is to average the alpha weighted texture images to determine the single composite texture image, the single composite texture image including alpha weighted pixel values at respective pixel positions of the single composite texture image.

Example 29 includes the apparatus of example 25, wherein the at least one processor is to replace the plurality of texture images with a source camera image associated with the source camera viewpoint corresponding to the input multiplane image stack to convert the plurality of texture images to the single composite texture image.

Example 30 includes the apparatus of example 25, wherein to convert the plurality of alpha images to the single composite alpha image, the at least one processor is to identify a first alpha plane index value corresponding to a first one of the alpha images with a largest alpha value among the alpha images at a first pixel position, identify a first alpha plane index value corresponding to neighbor alpha image of the first one of the alpha images with a next largest alpha value among the alpha images at the first pixel position, determine a bias value for the first pixel position, the bias value based on the largest alpha value and the next largest alpha value at the first pixel position, and combine the first alpha plane index value and the bias value to determine a composite alpha value to include in the single composite alpha image at the first pixel position.

Example 31 includes the apparatus of example 25, wherein to convert the plurality of alpha images to the single composite alpha image, the at least one processor is to identify an alpha plane index value corresponding to value of a source camera depth image at a first pixel position, the source camera depth image associated with the source camera viewpoint corresponding to the input multiplane image stack, determine a bias value for the first pixel position, the bias value based on the alpha plane index value for the first pixel position and the source camera depth image at the first pixel position, and combine the alpha plane index value and the bias value to determine a composite alpha value to include in the single composite alpha image at the first pixel position.

Example 32 includes the apparatus of example 25, wherein the at least one processor is to (i) convert the plurality of texture images to the single composite texture image to generate the compressed multiplane image stack and (ii) convert the plurality of alpha images to the single composite alpha image to generate the compressed multiplane image stack.

Example 33 includes an apparatus to compress multiplane image stacks, the apparatus comprising means for accessing an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images, and means for encoding the input multiplane image stack, the means for encoding to at least one of (i) convert the plurality of texture images to a single composite texture image to generate a compressed multiplane image stack, or (ii) convert the plurality of alpha images to a single composite alpha image to generate the compressed multiplane image stack.

Example 34 includes the apparatus of example 33, wherein the means for encoding is to combine the plurality of texture images based on the plurality of alpha images to convert the plurality of texture images to the single composite texture image.

Example 35 includes the apparatus of example 34, wherein to combine the plurality of texture images based on the plurality of alpha images, the means for encoding is to weight pixel values of ones of the texture images by pixel values of respective ones of the alpha images corresponding to the ones of the texture images to determine a plurality of alpha weighted texture images.

Example 36 includes the apparatus of example 35, wherein to combine the plurality of texture images based on the plurality of alpha images, the means for encoding is to average the alpha weighted texture images to determine the single composite texture image, the single composite texture image including alpha weighted pixel values at respective pixel positions of the single composite texture image.

Example 37 includes the apparatus of example 33, wherein the means for encoding is to replace the plurality of texture images with a source camera image associated with the source camera viewpoint corresponding to the input multiplane image stack to convert the plurality of texture images to the single composite texture image.

Example 38 includes the apparatus of example 33, wherein to convert the plurality of alpha images to the single composite alpha image, the means for encoding is to identify a first alpha plane index value corresponding to a first one of the alpha images with a largest alpha value among the alpha images at a first pixel position, identify a first alpha plane index value corresponding to neighbor alpha image of the first one of the alpha images with a next largest alpha value among the alpha images at the first pixel position, determine a bias value for the first pixel position, the bias value based on the largest alpha value and the next largest alpha value at the first pixel position, and combine the first alpha plane index value and the bias value to determine a composite alpha value to include in the single composite alpha image at the first pixel position.

Example 39 includes the apparatus of example 33, wherein to convert the plurality of alpha images to the single composite alpha image, the means for encoding is to identify an alpha plane index value corresponding to value of a source camera depth image at a first pixel position, the source camera depth image associated with the source camera viewpoint corresponding to the input multiplane image stack, determine a bias value for the first pixel position, the bias value based on the alpha plane index value for the first pixel position and the source camera depth image at the first pixel position, and combine the alpha plane index value and the bias value to determine a composite alpha value to include in the single composite alpha image at the first pixel position.

Example 40 includes the apparatus of example 33, wherein the means for encoding is to (i) convert the plurality of texture images to the single composite texture image to generate the compressed multiplane image stack and (ii) convert the plurality of alpha images to the single composite alpha image to generate the compressed multiplane image stack.

Example 41 includes an apparatus to decompress a compressed multiplane image stack, the apparatus comprising an interface to access the compressed multiplane image stack, the compressed multiplane image stack corresponding to a source camera viewpoint, the compressed multiplane image stack including at least one of (i) a single composite texture image that is to represent a plurality of uncompressed texture images or (ii) a single composite alpha image that is to represent a plurality of uncompressed alpha images, ones of the uncompressed alpha images to include pixel values representative of transparency of corresponding pixels in respective ones of the uncompressed texture images, and a compressed image decoder to at least one of (i) uncompress the single composite texture image to obtain the plurality of uncompressed texture images, or (ii) uncompress the single composite alpha image to obtain the plurality of uncompressed alpha images, the interface to output an uncompressed multiplane image stack including the plurality of uncompressed texture images and the plurality of uncompressed alpha images.

Example 42 includes the apparatus of example 41, wherein the compressed image decoder is to replicate the single composite texture image to uncompress the single composite texture image to obtain the plurality of uncompressed texture images.

Example 43 includes the apparatus of example 41, wherein to uncompress the single composite alpha image, the compressed image decoder is to set a first pixel position of a first one of the uncompressed alpha images to a first alpha value based on a value of the single composite alpha image at the first pixel position, set the first pixel position of a second one of the uncompressed alpha images to a second alpha value based on a value of the single composite alpha image at the first pixel position, and set alpha values at the first pixel position of remaining ones of the uncompressed alpha images to zero.

Example 44 includes the apparatus of example 43, wherein the compressed image decoder is to determine a first alpha plane index value for the first pixel position based on the value of the single composite alpha image at the first pixel position, determine a bias value for the first pixel position based on the first alpha plane index value and the value of the single composite alpha image at the first pixel position, determine a second alpha plane index value for the first pixel position based on the bias value for the first pixel position, determine the second alpha value based on the bias value for the first pixel position, and determine the first alpha value based on the second alpha value.

Example 45 includes the apparatus of example 41, wherein the compressed image decoder is to (i) uncompress the single composite texture image to obtain the plurality of uncompressed texture images, and (ii) uncompress the single composite alpha image to obtain the plurality of uncompressed alpha images.

Example 46 includes at least one non-transitory computer readable medium comprising computer readable instructions that, when executed, cause at least one processor to at least access a compressed multiplane image stack, the compressed multiplane image stack corresponding to a source camera viewpoint, the compressed multiplane image stack including at least one of (i) a single composite texture image that is to represent a plurality of uncompressed texture images or (ii) a single composite alpha image that is to represent a plurality of uncompressed alpha images, ones of the uncompressed alpha images to include pixel values representative of transparency of corresponding pixels in respective ones of the uncompressed texture images, at least one of (i) uncompress the single composite texture image to obtain the plurality of uncompressed texture images, or (ii) uncompress the single composite alpha image to obtain the plurality of uncompressed alpha images, and output an uncompressed multiplane image stack including the plurality of uncompressed texture images and the plurality of uncompressed alpha images.

Example 47 includes the at least one non-transitory computer readable medium of example 46, wherein the instructions cause the at least one processor to replicate the single composite texture image to uncompress the single composite texture image to obtain the plurality of uncompressed texture images.

Example 48 includes the at least one non-transitory computer readable medium of example 46, wherein to uncompress the single composite alpha image, the instructions cause the at least one processor to set a first pixel position of a first one of the uncompressed alpha images to a first alpha value based on a value of the single composite alpha image at the first pixel position, set the first pixel position of a second one of the uncompressed alpha images to a second alpha value based on a value of the single composite alpha image at the first pixel position, and set alpha values at the first pixel position of remaining ones of the uncompressed alpha images to zero.

Example 49 includes the at least one non-transitory computer readable medium of example 48, wherein the instructions cause the at least one processor to determine a first alpha plane index value for the first pixel position based on the value of the single composite alpha image at the first pixel position, determine a bias value for the first pixel position based on the first alpha plane index value and the value of the single composite alpha image at the first pixel position, determine a second alpha plane index value for the first pixel position based on the bias value for the first pixel position, determine the second alpha value based on the bias value for the first pixel position, and determine the first alpha value based on the second alpha value.

Example 50 includes the at least one non-transitory computer readable medium of example 46, wherein the instructions cause the at least one processor to (i) uncompress the single composite texture image to obtain the plurality of uncompressed texture images, and (ii) uncompress the single composite alpha image to obtain the plurality of uncompressed alpha images.

Example 51 includes a method to decompress a compressed multiplane image stack, the method comprising accessing the compressed multiplane image stack, the compressed multiplane image stack corresponding to a source camera viewpoint, the compressed multiplane image stack including at least one of (i) a single composite texture image that is to represent a plurality of uncompressed texture images or (ii) a single composite alpha image that is to represent a plurality of uncompressed alpha images, ones of the uncompressed alpha images to include pixel values representative of transparency of corresponding pixels in respective ones of the uncompressed texture images, at least one of (i) uncompressing the single composite texture image to obtain the plurality of uncompressed texture images, or (ii) uncompressing the single composite alpha image to obtain the plurality of uncompressed alpha images, and outputting an uncompressed multiplane image stack including the plurality of uncompressed texture images and the plurality of uncompressed alpha images.

Example 52 includes the method of example 51, wherein the uncompressing of the single composite texture image includes replicate the single composite texture image.

Example 53 includes the method of example 51, wherein the uncompressing of the single composite alpha image includes setting a first pixel position of a first one of the uncompressed alpha images to a first alpha value based on a value of the single composite alpha image at the first pixel position, setting the first pixel position of a second one of the uncompressed alpha images to a second alpha value based on a value of the single composite alpha image at the first pixel position, and setting alpha values at the first pixel position of remaining ones of the uncompressed alpha images to zero.

Example 54 includes the method of example 53, wherein the uncompressing of the single composite alpha image includes determining a first alpha plane index value for the first pixel position based on the value of the single composite alpha image at the first pixel position, determining a bias value for the first pixel position based on the first alpha plane index value and the value of the single composite alpha image at the first pixel position, determining a second alpha plane index value for the first pixel position based on the bias value for the first pixel position, determining the second alpha value based on the bias value for the first pixel position, and determining the first alpha value based on the second alpha value.

Example 55 includes the method of example 51, wherein the method includes (i) uncompressing the single composite texture image to obtain the plurality of uncompressed texture images, and (ii) uncompressing the single composite alpha image to obtain the plurality of uncompressed alpha images.

Example 56 includes an apparatus to decompress a compressed multiplane image stack, the apparatus comprising at least one memory, computer readable instructions, and at least one processor to execute the computer readable instructions to at least access a compressed multiplane image stack, the compressed multiplane image stack corresponding to a source camera viewpoint, the compressed multiplane image stack including at least one of (i) a single composite texture image that is to represent a plurality of uncompressed texture images or (ii) a single composite alpha image that is to represent a plurality of uncompressed alpha images, ones of the uncompressed alpha images to include pixel values representative of transparency of corresponding pixels in respective ones of the uncompressed texture images, at least one of (i) uncompress the single composite texture image to obtain the plurality of uncompressed texture images, or (ii) uncompress the single composite alpha image to obtain the plurality of uncompressed alpha images, and output an uncompressed multiplane image stack including the plurality of uncompressed texture images and the plurality of uncompressed alpha images.

Example 57 includes the apparatus of example 56, wherein the at least one processor is to replicate the single composite texture image to uncompress the single composite texture image to obtain the plurality of uncompressed texture images.

Example 58 includes the apparatus of example 56, wherein to uncompress the single composite alpha image, the at least one processor is to set a first pixel position of a first one of the uncompressed alpha images to a first alpha value based on a value of the single composite alpha image at the first pixel position, set the first pixel position of a second one of the uncompressed alpha images to a second alpha value based on a value of the single composite alpha image at the first pixel position, and set alpha values at the first pixel position of remaining ones of the uncompressed alpha images to zero.

Example 59 includes the apparatus of example 58, wherein the at least one processor is to determine a first alpha plane index value for the first pixel position based on the value of the single composite alpha image at the first pixel position, determine a bias value for the first pixel position based on the first alpha plane index value and the value of the single composite alpha image at the first pixel position, determine a second alpha plane index value for the first pixel position based on the bias value for the first pixel position, determine the second alpha value based on the bias value for the first pixel position, and determine the first alpha value based on the second alpha value.

Example 60 includes the apparatus of example 56, wherein the at least one processor is to (i) uncompress the single composite texture image to obtain the plurality of uncompressed texture images, and (ii) uncompress the single composite alpha image to obtain the plurality of uncompressed alpha images.

Example 61 includes an apparatus to decompress a compressed multiplane image stack, the apparatus comprising means for accessing the compressed multiplane image stack, the compressed multiplane image stack corresponding to a source camera viewpoint, the compressed multiplane image stack including at least one of (i) a single composite texture image that is to represent a plurality of uncompressed texture images or (ii) a single composite alpha image that is to represent a plurality of uncompressed alpha images, ones of the uncompressed alpha images to include pixel values representative of transparency of corresponding pixels in respective ones of the uncompressed texture images, and means for decoding the compressed multiplane image stack, the means for decoding to at least one of (i) uncompress the single composite texture image to obtain the plurality of uncompressed texture images, or (ii) uncompress the single composite alpha image to obtain the plurality of uncompressed alpha images.

Example 62 includes the apparatus of example 61, wherein the means for decoding is to replicate the single composite texture image to uncompress the single composite texture image to obtain the plurality of uncompressed texture images.

Example 63 includes the apparatus of example 61, wherein to uncompress the single composite alpha image, the means for decoding is to set a first pixel position of a first one of the uncompressed alpha images to a first alpha value based on a value of the single composite alpha image at the first pixel position, set the first pixel position of a second one of the uncompressed alpha images to a second alpha value based on a value of the single composite alpha image at the first pixel position, and set alpha values at the first pixel position of remaining ones of the uncompressed alpha images to zero.

Example 64 includes the apparatus of example 63, wherein the means for decoding is to determine a first alpha plane index value for the first pixel position based on the value of the single composite alpha image at the first pixel position, determine a bias value for the first pixel position based on the first alpha plane index value and the value of the single composite alpha image at the first pixel position, determine a second alpha plane index value for the first pixel position based on the bias value for the first pixel position, determine the second alpha value based on the bias value for the first pixel position, and determine the first alpha value based on the second alpha value.

Example 65 includes the apparatus of example 61, wherein the means for decoding is to (i) uncompress the single composite texture image to obtain the plurality of uncompressed texture images, and (ii) uncompress the single composite alpha image to obtain the plurality of uncompressed alpha images.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to compress multiplane image stacks, the apparatus comprising:
   interface circuitry;
   machine readable instructions; and
   at least one programmable circuit to be programmed based on the machine readable instructions to:
   access an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images; and
   at least one of (i) replace the plurality of texture images with a source camera image associated with the source camera viewpoint corresponding to the input multiplane image stack to convert the plurality of texture images to a single composite texture image, or (ii) convert the plurality of alpha images to a single composite alpha image including a composite alpha value at a pixel position of the single composite alpha image, the composite alpha value based on a combination of an alpha plane index value and a bias value, the alpha plane index value based on a value of a source camera depth image at the pixel position, the bias value based on the alpha plane index value and the value of the source camera depth image at the pixel position, the source camera depth image associated with the source camera viewpoint corresponding to the input multiplane image stack;
   generate a compressed multiplane image stack based on at least one of the single composite texture image or the single composite alpha image; and
   output the compressed multiplane image stack.

2. The apparatus of claim 1, wherein the single composite texture image is a first composite texture image, and one or more of the at least one programmable circuit is to:
   access a second input multiplane image stack including a second plurality of texture images and a corresponding second plurality of alpha images;
   combine the second plurality of texture images based on the second plurality of alpha images to convert the second plurality of texture images to a second composite texture image; and
   generate a second compressed multiplane image stack based on the second composite texture image.

3. The apparatus of claim 2, wherein to combine the second plurality of texture images based on the second plurality of alpha images, one or more of the at least one programmable circuit is to weight pixel values of ones of the second plurality of texture images by pixel values of ones of the second plurality of alpha images corresponding respectively to the ones of the second plurality of texture images to determine a plurality of alpha weighted texture images.

4. The apparatus of claim 3, wherein to combine the second plurality of texture images based on the second plurality of alpha images, one or more of the at least one programmable circuit is to average the alpha weighted texture images to determine the single second composite texture image, the second composite texture image including alpha weighted pixel values at respective pixel positions of the second composite texture image.

5. The apparatus of claim 1, wherein the single composite alpha image is a first composite alpha image, and one or more of the at least one programmable circuit is to:
   access a second input multiplane image stack including a second plurality of texture images and a corresponding second plurality of alpha images; and
   convert the second plurality of alpha images to a second composite alpha image by:
      identifying a first alpha plane index value corresponding to a first one of the second plurality of alpha images with a largest alpha value among the second plurality of alpha images at a first pixel position of the second input multiplane image stack;
      identifying a second alpha plane index value corresponding to a neighbor alpha image of the first one of the second plurality of alpha images with a next largest alpha value among the second plurality of alpha images at the first pixel position;
      determining a bias value for the first pixel position, the bias value for the first pixel position based on the largest alpha value and the next largest alpha value at the first pixel position; and
      combining the first alpha plane index value and the bias value for the first pixel position to determine a composite alpha value to include in the second composite alpha image at the first pixel position.

6. The apparatus of claim 1, wherein one or more of the at least one programmable circuit is to generate the compressed multiplane image stack based on the single composite texture image and the single composite alpha image.

7. At least one non-transitory computer readable medium comprising computer readable instructions to cause at least one programmable circuit to at least:
   access an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images;
   at least one of (i) replace the plurality of texture images with a source camera image associated with the source camera viewpoint corresponding to the input multiplane image stack to convert the plurality of texture images to a single composite texture image, or (ii) convert the plurality of alpha images to a single composite alpha image including a composite alpha value at a pixel position of the single composite alpha image, the composite alpha value based on a combination of an alpha plane index value and a bias value, the alpha plane index value based on a value of a source camera depth image at the pixel position, the bias value based on the alpha plane index value and the value of the source camera depth image at the pixel position, the source camera depth image associated with the source camera viewpoint corresponding to the input multiplane image stack;
   generate a compressed multiplane image stack based on at least one of the single composite texture image or the single composite alpha image; and
   output the compressed multiplane image stack.

8. The at least one non-transitory computer readable medium of claim 7, wherein the single composite texture image is a first composite texture image, and the instructions are to cause one or more of the at least one programmable circuit to:
   access a second input multiplane image stack including a second plurality of texture images and a corresponding second plurality of alpha images;

combine the second plurality of texture images based on the second plurality of alpha images to convert the second plurality of texture images to a second composite texture image; and generate a second compressed multiplane image stack based on the second composite texture image.

9. The at least one non-transitory computer readable medium of claim 8, wherein to combine the second plurality of texture images based on the second plurality of alpha images, the instructions are to cause one or more of the at least one programmable circuit to weight pixel values of ones of the second plurality of texture images by pixel values of ones of the second plurality of alpha images corresponding respectively to the ones of the second plurality of texture images to determine a plurality of alpha weighted texture images.

10. The at least one non-transitory computer readable medium of claim 9, wherein to combine the second plurality of texture images based on the second plurality of alpha images, the instructions are to cause one or more of the at least one programmable circuit to average the alpha weighted texture images to determine the second composite texture image, the second composite texture image including alpha weighted pixel values at respective pixel positions of the second composite texture image.

11. The at least one non-transitory computer readable medium of claim 7, wherein the single composite alpha image is a first composite alpha image, the instructions are to cause one or more of the at least one programmable circuit to:

access a second input multiplane image stack including a second plurality of texture images and a corresponding second plurality of alpha images; and convert the second plurality of alpha images to a second composite alpha image by:

identifying a first alpha plane index value corresponding to a first one of the second plurality of alpha images with a largest alpha value among the second plurality of alpha images at a first pixel position of the second input multiplane image stack;

identifying a second alpha plane index value corresponding to a neighbor alpha image of the first one of the second plurality of alpha images with a next largest alpha value among the second plurality of alpha images at the first pixel position;

determining a bias value for the first pixel position, the bias value for the first pixel position based on the largest alpha value and the next largest alpha value at the first pixel position; and combining the first alpha plane index value and the bias value for the first pixel position to determine a composite alpha value to include in the second composite alpha image at the first pixel position.

12. The at least one non-transitory computer readable medium of claim 7, wherein the instructions are to cause one or more of the at least one programmable circuit to generate the compressed multiplane image stack based on the single composite texture image and the single composite alpha image.

13. A method to compress multiplane image stacks, the method comprising:

accessing an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images;

at least one of (i) replacing the plurality of texture images with a source camera image associated with the source camera viewpoint corresponding to the input multiplane image stack to convert the plurality of texture images to a single composite texture image, or (ii) converting the plurality of alpha images to a single composite alpha image including a composite alpha value at a pixel position of the single composite alpha image, the composite alpha value based on a combination of an alpha plane index value and a bias value, the alpha plane index value based on a value of a source camera depth image at the pixel position, the bias value based on the alpha plane index value and the value of the source camera depth image at the pixel position, the source camera depth image associated with the source camera viewpoint corresponding to the input multiplane image stack;

generating a compressed multiplane image stack based on at least one of the single composite texture image or the single composite alpha image; and outputting the compressed multiplane image stack.

14. The method of claim 13, wherein the single composite texture image is a first composite texture image, and including:

accessing a second input multiplane image stack including a second plurality of texture images and a corresponding second plurality of alpha images;

combining the second plurality of texture images based on the second plurality of alpha images to convert the second plurality of texture images to a second composite texture image; and generating a second compressed multiplane image stack based on the second composite texture image.

15. The method of claim 14, wherein the combining of the second plurality of texture images includes weighting pixel values of ones of the second plurality of texture images by pixel values of ones of the second plurality of alpha images corresponding respectively to the ones of the second plurality of texture images to determine a plurality of alpha weighted texture images.

16. The method of claim 15, wherein the combining of the second plurality of texture images includes averaging the alpha weighted texture images to determine the second composite texture image, the second composite texture image including alpha weighted pixel values at respective pixel positions of the second composite texture image.

17. The method of claim 13, wherein the single composite alpha image is a first composite alpha image, and including:

accessing a second input multiplane image stack including a second plurality of texture images and a corresponding second plurality of alpha images; and converting the second plurality of alpha images to a second composite alpha image by:

identifying a first alpha plane index value corresponding to a first one of the second plurality of alpha images with a largest alpha value among the second plurality of alpha images at a first pixel position;

identifying a second alpha plane index value corresponding to a neighbor alpha image of the first one of the second plurality of alpha images with a next largest alpha value among the second plurality of alpha images at the first pixel position;

determining a bias value for the first pixel position, the bias value for the first pixel position based on the largest alpha value and the next largest alpha value at the first pixel position; and combining the first alpha plane index value and the bias value for the first pixel position to determine a composite alpha value to include in the second composite alpha image at the first pixel position.

18. The method of claim 13, wherein the generating of the compressed multiplane image stack is based on the single composite texture image and the single composite alpha image.

19. An apparatus to compress multiplane image stacks, the apparatus comprising:

means for accessing an input multiplane image stack corresponding to a source camera viewpoint, the input multiplane image stack including a plurality of texture images and a corresponding plurality of alpha images, ones of the alpha images including pixel values representative of transparency of corresponding pixels in respective ones of the texture images; and means for encoding the input multiplane image stack, the means for encoding to:

at least one of (i) replace the plurality of texture images with a source camera image associated with the source camera viewpoint corresponding to the input multiplane image stack to convert the plurality of texture images to a single composite texture image, or (ii) convert the plurality of alpha images to a single composite alpha image including a composite alpha value at a pixel position of the single composite alpha image, the composite alpha value based on a combination of an alpha plane index value and a bias value, the alpha plane index value based on a value of a source camera depth image at the pixel position, the bias value based on the alpha plane index value and the value of the source camera depth image at the pixel position, the source camera depth image associated with the source camera viewpoint corresponding to the input multiplane image stack; and generate a compressed multiplane image stack based on at least one of the single composite texture image or the single composite alpha image.

20. The apparatus of claim 19, wherein the means for encoding is to generate the compressed multiplane image stack based on the single composite texture image and the single composite alpha image.

* * * * *

UNITED STATES PATENT AND TRADEMARK OFFICE
CERTIFICATE OF CORRECTION

| | | |
|---|---|---|
| PATENT NO. | : 12,450,780 B2 | Page 1 of 1 |
| APPLICATION NO. | : 17/926532 | |
| DATED | : October 21, 2025 | |
| INVENTOR(S) | : Janus et al. | |

It is certified that error appears in the above-identified patent and that said Letters Patent is hereby corrected as shown below:

In the Claims

Column 37, Claim 4, Line 61, Delete: "single"

Signed and Sealed this
Twenty-seventh Day of January, 2026

John A. Squires
*Director of the United States Patent and Trademark Office*